(12) United States Patent
Amanai et al.

(10) Patent No.: US 6,900,951 B2
(45) Date of Patent: May 31, 2005

(54) DISPLAY OPTICAL SYSTEM

(75) Inventors: Takahiro Amanai, Sagamihara (JP); Takayoshi Togino, Koganei (JP)

(73) Assignee: Olympus Corporation, Tokyo (JP)

( * ) Notice: Subject to any disclaimer, the term of this patent is extended or adjusted under 35 U.S.C. 154(b) by 19 days.

(21) Appl. No.: 10/442,944

(22) Filed: May 22, 2003

(65) Prior Publication Data

US 2004/0233546 A1 Nov. 25, 2004

(51) Int. Cl.$^7$ .................. G02B 17/00; G02B 27/14
(52) U.S. Cl. ................ 359/729; 359/631; 359/731
(58) Field of Search .................. 359/15, 627, 630, 359/631, 633, 637, 638, 676, 720, 728, 737, 729, 730, 731; 345/7, 8; 250/221, 226, 494.1; 353/20, 31

(56) References Cited

U.S. PATENT DOCUMENTS 6,331,916 B1    12/2001  Mukawa ............... 359/630
6,452,577 B1 *   9/2002  Gale et al. ............ 345/87
6,512,635 B1 *   1/2003  Takeyama ............ 359/638
2003/0034935 A1 * 2/2003  Amanai et al. ........ 345/7

FOREIGN PATENT DOCUMENTS

JP          2000-89227        3/2000

* cited by examiner

Primary Examiner—Georgia Epps
Assistant Examiner—William Choi
(74) Attorney, Agent, or Firm—Kenyon & Kenyon

(57) ABSTRACT

The invention relates to a small-format display optical system using a reflection type image device as an image display device and capable of displaying bright, high-resolution images. The display optical system comprises a reflection type display device 3 for displaying an image, an illumination light source 5 for illuminating the reflection type display device 3, an illumination optical system for guiding light from the illumination light source 5 to the reflection type disply device 3, a relay optical system 21 for projection of an image appearing on the reflection type display device 3 and an eyepiece optical system 22 acting to converge a light beam from the relay optical system 21 toward the eyeball of a viewer. An image projected through the relay optical system 21 is formed near the eyepiece optical system 22.

10 Claims, 18 Drawing Sheets

DISPLAY OPTICAL SYSTEM

BACKGROUND OF THE INVENTION

The present invention relates generally to an image display system, and more particularly to an optical system for a reflection type display device-incorporating display system that is compact, portable, and low power consumption.

Among small-format display systems, there are cellular phones and personal digital assistants. For these small-format display systems, liquid crystal display devices of the direct-view type are often used. Especially for high-definition, high pixel resolution images and moving images, it is required to make use of active matrix liquid crystals having fast display speeds. However, the active matrix liquid crystals cost much and so do systems. The active matrix liquid crystals consume much power, and require large-capacity batteries for displays over an extended period of time. Further, there is an apprehension that images appearing on image display systems may be peeped by those around the viewer.

On the other hand, there are small-format display device-incorporating display systems wherein an image appearing on a display device is magnified and displayed through an optical system, as set forth typically in JP-A's 48-102527 and 5-303054. In these display systems, an image appearing on the display device is magnified and displayed as a virtual image using a concave mirror. The latter in particular makes use of a non-rotationally symmetric reflecting surface whereby an image with reduced aberrations is obtained. However, the size of the display device must be relatively large; it is not always possible to rely on a display device that is much smaller than that used with a direct-view type display system.

An approach involving the projection midair of an image on a display device through a projection optical system and the magnification and display of that image by a concave mirror is disclosed in JP-A's 5-303055 and 2000-221440, and systems therefor are shown in JP-A's 7-270781 and 9-139901.

Furthermore, JP-A 2002-268005 comes up with a small-format, low power consumption display system wherein an image appearing on a display device or its intermediate image is projected through a relay optical system that comprises a decentered prism optical system. A light beam from that relay optical system is then converged to the eyeball of a viewer through an eyepiece optical system. In this display system, an image projected through the relay optical system is formed near the eyepiece optical system, and the exit pupil of the relay optical system is projected onto the viewer's eyeball.

It is here noted that a reflection type liquid crystal display device is higher than a transmission type liquid crystal display device in terms of aperture efficiency. This is because in the transmission type liquid crystal display device a drive circuit comprising interconnection wires, electrodes, etc. is located within a display screen surface whereas in the reflection type liquid crystal display device these are mounted on the back surface. For this reason, the reflection type liquid crystal display device can present bright image displays. The reflection type liquid crystal display device, because of being capable of achieving high densities, can provide a display system having high-pixel resolution. Another possible reflection type display device is typically a DMD (digital micro-mirror device).

SUMMARY OF THE INVENTION

The present invention provides a display optical system, comprising in combination:

a reflection type display device for displaying an image, an illumination light source for illuminating said reflection type display device, an illumination optical system for guiding light from said illumination light source to said reflection type display device, a relay optical system for projection of an image appearing on said reflection type display device, and an eyepiece optical system for converging a light beam from said relay optical system at a predetermined position, wherein said eyepiece optical system is located at or near a position of an image projected through said relay optical system.

Still other objects and advantages of the invention will be part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENTS

Figure 1:
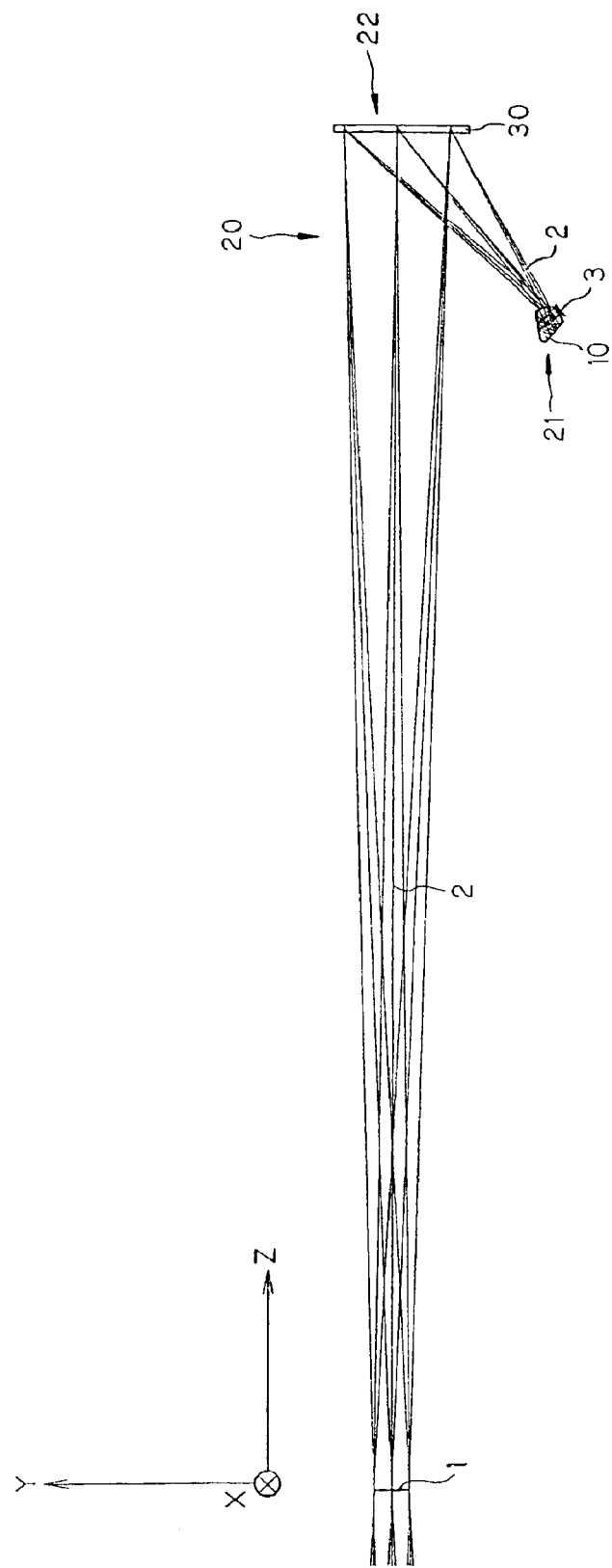
FIG. 1 is illustrative in section of the whole arrangement of Example 1 of the display optical system according to the invention.

Why the above arrangement is herein used, and how it works is now explained.

Small-format display devices have good productivity. For this reason, display devices having high pixel resolution are easily available at low costs. The display device used herein should be designed in such a way as to display images having a diagonal length of preferably 1 inch or less, and more preferably 0.5 inch or less. Use of such a display device is advantageous for setting up less expensive display systems.

When such a small-format display device as mentioned above is used, however, no sufficient magnifying power is obtained only by use of an optical system such as a magnifying glass; it is impossible to view any image of sufficient size. Accordingly, the image appearing on the display device is magnified and projected through the relay optical system. In this case, that image should be magnified and projected near the eyepiece optical system.

The image projected through the relay optical system is then magnified through the eyepiece optical system. At the same time, the light beam from the relay optical system is converged via the eyepiece optical system at a predetermined position where the eyeball of a viewer is positioned for viewing.

Thus, a small-format yet high-performance display optical system can be set up.

For the display device, a reflection type display device is used, which enables the aperture efficiency for each pixel to be higher than that of a transmission type display device. This makes images under observation bright, and makes it easy to achieve so high density that a display system of high pixel resolution can be offered.

Further, the illumination light source is designed to sequentially emit light in tune with the images displayed, thereby providing images having high pixel resolution.

In the above arrangement, it is preferable to use a prism optical system as the relay optical system.

In a reflecting optical element such as a mirror or prism, there is in principle no chromatic aberration even with power given to its reflecting surface. It is thus unnecessary to provide any additional optical element to the reflecting optical element for the purpose of correction of chromatic aberrations alone. From the standpoint of correction of chromatic aberrations, an optical system using the reflecting optical element can thus be much more reduced than an optical system using a refracting optical element in terms of the number of optical elements.

At the same time, the reflecting optical system using a reflecting optical element can be designed such that an optical path can fold over itself. This enables the optical system itself to be much smaller than a refracting optical system.

A reflecting surface, higher than a refracting surface in terms of sensitivity to decentration errors, must have higher precision for alignment upon assembly. Among reflecting optical elements, however, a prism has its respective surfaces relatively fixed. In other words, only control of decentration of the prism per se is needed. For the prism it is not required to have higher assembly precision and more control steps than required.

Further, the prism comprises an entrance surface and an exit surface, each being a refracting surface, and a reflecting surface. Thus, the prism has a higher flexibility in correction of aberrations, as compared with a mirror simply comprising a reflecting surface. In particular, the prism is designed such that a substantial portion of the desired power can be allocated to the reflecting surface; the power of the entrance surface and exit surface, each being a refracting power, can be made weaker, correspondingly. This enables chromatic aberrations to be much more reduced as compared with the mirror, while the flexibility in correction of aberrations is kept high. Moreover, when compared with a refracting optical element such as a lens, too, the prism is much more reduced in terms of chromatic aberrations.

The prism is filled therein with a transparent medium has a higher refractive index than does air, ensuring that a longer optical path than in air can be taken. This enables an optical system to be much more reduced in thickness and size as compared with the use of a lens or mirror located in air.

A display optical system is required to have satisfactory image-formation capability not only at its central area but also as far as its peripheral area. In a coaxial optical system in general, the sign of the height of off-axis light rays is reversed before and after a stop. This causes an imbalance in the symmetry of an optical element with respect to the stop, rendering off-axis aberrations worse. This symmetry with respect to the stop is fully satisfied by locating refracting surfaces with the stop interposed between them. Correction of off-axis aberrations is generally made in this way.

The prism optical system used herein is a decentered prism optical system. This decentered prism optical system comprises at least one reflecting surface that is curved in such a way as to give power to a light beam. The reflecting surface is also formed of a rotationally asymmetric surface having a function of correcting decentration aberrations.

More specifically, the decentered prism optical system is formed of a prism member comprising an entrance surface, at least one reflecting surface and an exit surface. Through the entrance surface, a light beam enters the prism. At the reflecting surface, the incident light beam is reflected in the prism, and through the exit surface the light beam leaves the prism.

The at least one reflecting surface is curved in such a way as to give power to the light beam and have a rotationally asymmetric surface shape. That curved surface acts to make correction for decentration aberrations. In the present invention, decentration aberrations are corrected with such a prism member. It is consequently possible to make good correction for aberrations not only at the center area but also in off-axis areas.

Preferably but not exclusively, a free-form surface should be used for the rotationally asymmetric curved surface shape. The free-form surface, for instance, is defined by formula (a) in U.S. Pat No. 6,124,989 (JP-A 2000-66105), and the Z-axis of that defining formula provides the axis of the free-form surface.

In the present invention, a decentered prism optical system is used as the relay optical system for the above reasons. This decentered prism optical system comprises a prism member. An image appearing on the display device is then magnified and projected near the eyepiece optical system. With such an arrangement, it is possible to achieve a small-format yet high-performance relay optical system.

In this case, an image appearing on the display device is projected through the relay optical system to form a primary image. Here, the chief ray of each light beam arrives at the position of the primary image while diverging from the relay optical system. To this end, the eyepiece optical system must act to converge the diverging chief rays to the eye of the viewer with efficiency. When the eyepiece optical system has no such converging action, the chief rays arrive at the viewer while they are diverging. For this reason, a light beam incident on the eyeball and perceived as an image accounts for only a part of light rays leaving the display device. Consequently, the viewer could view only a very dark image.

Through the above arrangement in the present invention, the light beams leaving the reflection type display device and passing through the relay optical system can effectively be converged to the eyeball of the viewer, ensuring that image displays are obtainable with high illumination efficiency. There is thus no apprehension that even in an electric train or the like, those around the viewer may look furtively the images appearing on the image display device.

To allow the image appearing on the reflection type display device to be viewed, it is necessary to provide an illumination optical system for guiding light from the illumination light source to the reflection type display device. To this end, the illumination optical system and the relay optical system should preferably have at least one common surface. In other words, the illumination optical system should preferably make use of at least one optical surface of the decentered prism optical system.

As described above, at least one of the optical surfaces that form the decentered prism optical system constitutes a part of the illumination optical system. This enables the number of components to be reduced, and the respective optical paths to be formed on the same area, so that the size of the display system can be diminished.

Here let θ represent an angle that a given reference axis makes with an axial chief ray leaving the reflection type display device. Then, this angle should preferably satisfy the following condition (1):

$$0°≦θ<45° \quad (1)$$

It is noted that the given reference axis means the normal that passes through the center of a screen surface of the reflection type display device.

As this angle is greater than the upper limit of 45° to condition (1), many light beams exceeding the angle range that ensures satisfactory image displays are included in the light beams reflected at the reflection type display device. Consequently, any normal images are not obtainable for the reasons of reversals of brightness, contrast, etc.

More preferably, the following condition (1-1) should be satisfied instead of condition (1):

$$0°≦θ<30° \quad (1-1)$$

Most preferably, the following condition (1-2) should be satisfied in lieu of condition (1):

$$0°≦θ<20° \quad (1-2)$$

It is noted that in Example 1 given later θ=12.6°; in Example 2 θ=13.4°; in Example 3 θ=2.3° 1 and in Example 4 θ=5.4°.

Preferably, the decentered prism optical system should have a symmetric plane. In this case, prism processing is facilitated and alignment operations for the respective members become easy, resulting in simplified fabrication or assembly.

Alternatively, the decentered prism optical system may have no symmetric plane. In this case, the direction of incidence of illumination light on the decentered prism optical system can be set at one's disposal. This makes further size reductions of the display optical system feasible, and is advantageous for correction of aberrations as well.

Preferably in that case, the illumination light source should be located such that the optical axis of illumination light incident on the given reflecting surface is not included in a plane that passes through an axial chief ray of projection light reflected at that given reflecting surface and the center of the screen surface.

It is here understood that the optical axis of illumination light means the center light ray of an illumination light beam, and the center light ray of the illumination light beam means a light ray of the illumination light from the illumination light source, which light ray arrives at the center of the screen surface of the reflection type display device. It is also understood that the given reflecting surface means the first reflecting surface as counted from the reflection type display device of the display optical system in order of propagation of projection light.

The present invention is now explained with reference to why the illumination light source is located in this fashion; however, this does not hold true for any special decentration arrangement.

In the decentered prism optical system, the direction of decentration of its reflecting surface lies in the direction of the plane that passes through the axial chief ray of projection light reflected at that reflecting surface and the center of the screen surface. Suppose now that the optical axis of illumination light incident on that reflecting surface is found in that plane. Then, the reflecting area of that reflecting surface must be commensurate with the area needed for reflection of both illumination light and projection light. In other words, the effective surface of that surface in the decentration direction must be increased, resulting in an increase in the size of the decentered prism optical system. Unless the effective surface is increased, on the other hand, a part of the light beam is shaded, leading to difficulty in bright, uniform projection.

By contrast, suppose that the illumination light source is located as described above. Then, illumination light and projection light are generally found on that surface in a direction intersecting the direction of decentration. In other words, the effective surface can be increased in the direction that intersects the direction of decentration. It is noted, however, that this does not lead to any increase in the size of the decentered prism optical system.

Preferably in the decentered prism optical system, an additional reflecting surface for reflection of projection light should be located near the refracting (entrance) surface on which illumination light is incident, so that the refracting surface can also serve as a reflecting surface. In this common surface, the illumination light can be separated from projection light. Consequently, the common surface need not be constructed of a half-silvered mirror; bright image displays can be obtained.

It is noted that when there is an ample quantity of illumination light or projection light, for instance, a half-silvered mirror or a polarization beam splitter may be used for the above common surface. In this case, it is unnecessary to separate illumination light from projection light. In other words, the common surface can be made so small that the size of the decentered prism optical system can be diminished.

In the above common surface, the reflecting surface for reflection of projection light should preferably be set up in such a way as to make use of total reflection, because losses of illumination light and projection light can be reduced.

It is also preferable that the illumination light source is located in the vicinity of a position optically conjugate to the exit pupil of the relay optical system, because the image of the illumination light source occurs at the position of the exit pupil of the display optical system so that images of uniform brightness can be viewed.

Further, it is preferable that the exit pupil of the relay optical system is found within the decentered prism optical system, because the effective diameter of the reflecting surface can be diminished. This is preferable in view of optical performance, because the amount of decentration aberrations occurring at the reflecting surface can be reduced.

For the decentered prism used herein for the relay optical system, various decentered prisms having one or more internal reflections may be used. In this case, one or two or more decentered prisms may be used.

Typical decentered prisms are exemplified in Examples 1 to 4 given later. Each decentered prism comprises an entrance surface through which projection light enters the prism, two reflecting surfaces (a first and a second reflecting surface) and an exit surface via which the projection light leaves the prism. Then, the respective surfaces are located such that an optical path connecting the entrance surface and the first reflecting surface crosses an optical path connecting the second reflecting surface and the exit surface in the prism.

It is noted that in a decentered prism having no symmetric plane, both optical paths cross each other as one optical path is projected onto a plane including another optical path.

With such a configured decentered prism, the flexibility in correction of aberrations can be so improved that aberrations can be much more reduced or limited. The prism with both optical paths crossing each other ensures that both the reflecting surfaces can be located with high symmetry, so that aberrations occurring at two such reflecting surfaces can be mutually corrected at them, resulting in reduced or limited aberrations.

The prism with both optical paths crossing each other enables their length to be longer than could be achieved with a prism having a simple turned-back optical path, and so the size of the prism can be diminished relative to the long optical path length.

The eyepiece optical system is now explained. Preferably, the eyepiece optical system should be constructed of an optical element having a Fresnel surface, because the thickness and weight of the eyepiece optical system can be reduced. That Fresnel surface may be either a reflecting surface or a transmitting surface. When the Fresnel surface of an optical element is a reflecting surface, the optical element is a Fresnel reflecting mirror, and when the Fresnel surface of an optical element is a transmitting surface, the optical element is a Fresnel lens.

That Fresnel surface should preferably be a rotationally symmetric surface, because of ease with which it is fabricated. Alternatively, the Fresnel surface may be a free-form surface. This is preferable because distortions or the like due to decentration can be corrected.

The display optical system of the invention is now explained specifically with reference to its examples.

How to determine coordinates in the following examples is first explained. An optical axis 2 of projection light is defined by a light ray that passes through the center of an exit pupil 1 of a display optical system 20 to the center of a reflection type display device 3, and an optical axis 4 of illumination light is defined by a light ray that propagates from the center of the reflection type display device 3 to the center of an illumination light source 5. It is here noted that ray tracing is performed in the form of back ray tracing from the position of the exit pupil 1 of the display optical system 20 (the pupil of a viewer) toward the illumination light source 5 via the reflection type display device 3.

Then, the origin of the optical system is defined by the center of the exit pupil 1. It is noted that this origin is also the origin of a decentered optical surface in a decentered optical system. The positive direction for a Z-axis is defined by the direction of the optical axis 2 of projection light running from that origin toward a final surface that faces the exit pupil 1 of the display optical system 20. This final surface, for instance, is an exit surface 31 of an eyepiece optical system 22 in FIGS. 2 and 3.

The surface of the paper of FIG. 1 defines a Y-Z plane. An X-axis is defined by an axis that passes through the origin and is orthogonal to the Y-Z plane. The positive direction for the X-axis is defined by a direction passing through the paper from its front, and a Y-axis is defined by an axis that forms a right-hand orthogonal coordinate system with the X- and Z-axes.

EXAMPLE 1

This example is directed to a display optical system having a horizontal angle of view of 20° and a vertical angle of view of 15°. An exit pupil diameter is φ10 mm and a distance from an exit pupil 1 (corresponding to the eyeball position of a viewer) to an image formed through a relay optical system 21 is 40 cm. A 3.9×2.9 mm reflection type display device 3 is used.

Figure 2:
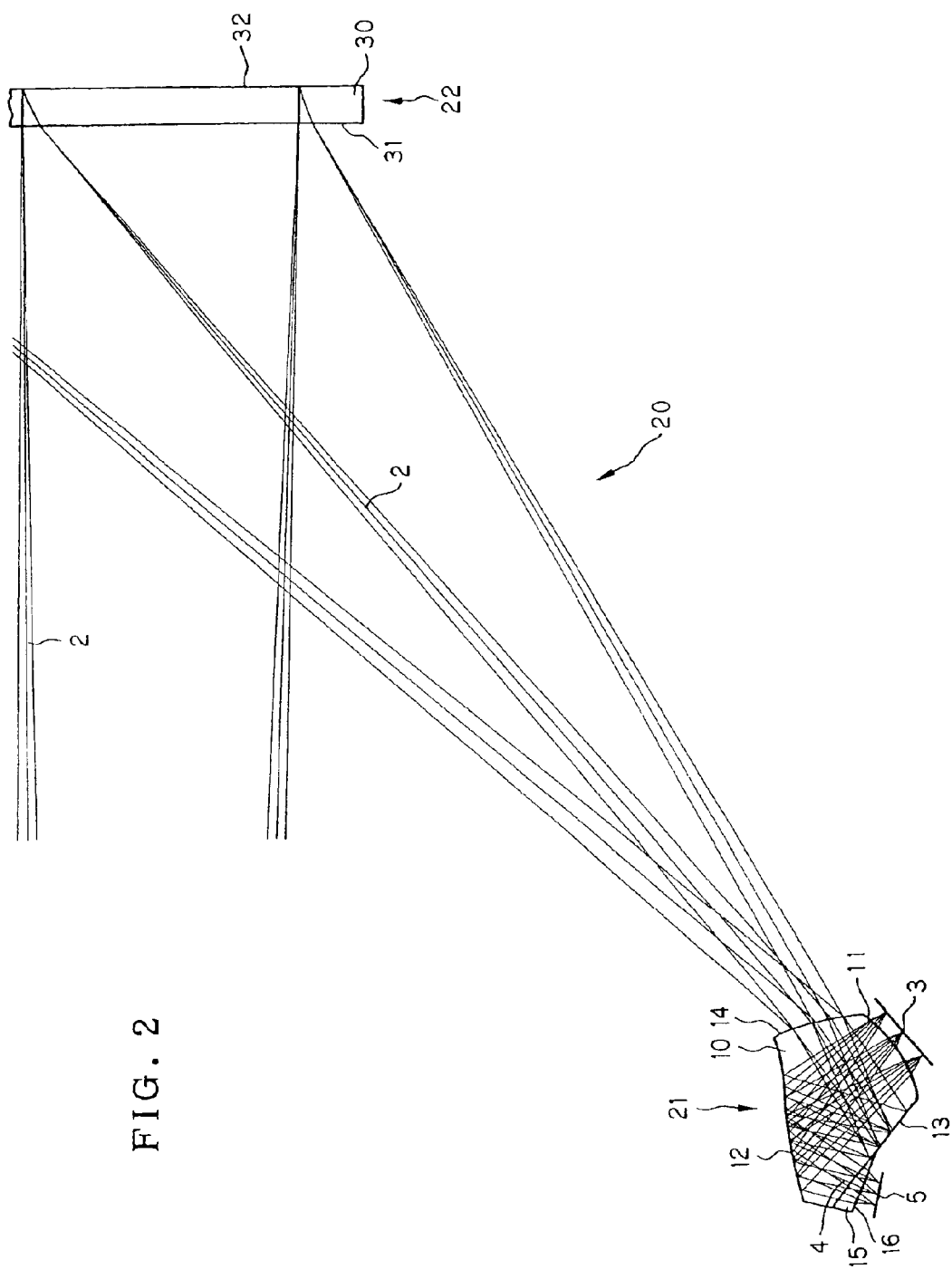
FIG. 2 is a partly enlarged view of part of the display optical system shown in FIG. 1.
Figure 3:
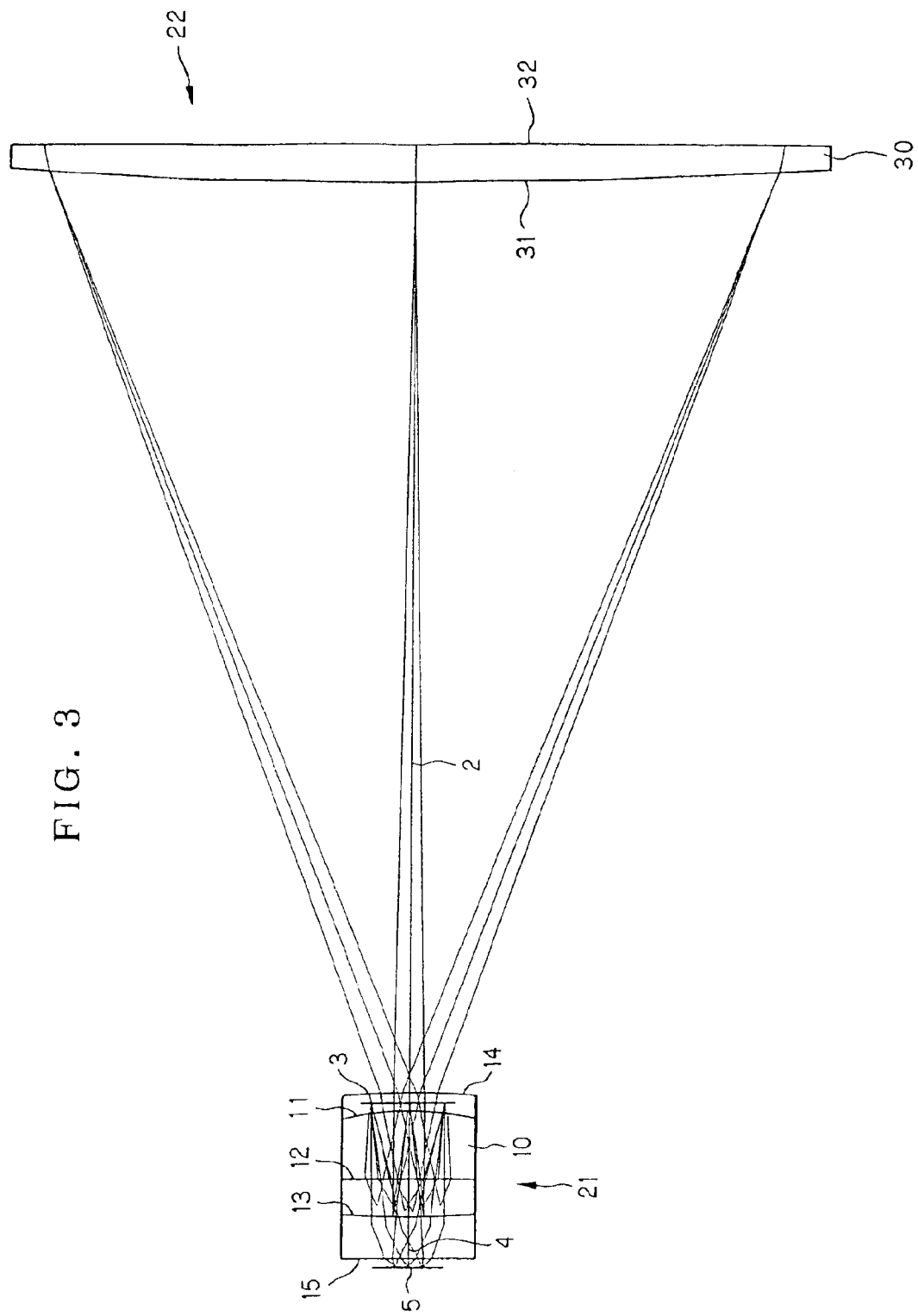
FIG. 3 is an optical path as projected for part of Example 1 of the display optical system.

FIG. 1 is an optical path diagram in a Y-Z plane for the whole arrangement from an exit pupil 1 to a display optical system 20. However, it is noted that an illumination optical path, i.e., an optical path from an illumination light source 5 to a decentered prism 10 for a relay optical system 21 is omitted. FIG. 2 is a partly enlarged view of the display optical system 20 portion in FIG. 1, and FIG. 3 is an optical path for the display optical system 20 portion as projected onto an X-Z plane.

In the display optical system 20 according to this example, the decentered prism 10 is used as the relay optical system 21. The decentered prism 10, because of having a decentered optical surface, provides a decentered prism optical system.

As viewed in order of back ray tracing from the exit pupil 1 side, the display optical system according to the instant example is made up of a Fresnel reflecting mirror 30 that forms an eyepiece optical system 22, a decentered prism 10 that forms a relay optical system 21, a reflection type display device 3 located facing a first surface 11 of the decentered prism 10, an illumination light-introducing transparent medium 15 bonded to a part of a third surface 13 of the decentered prism 10 and an illumination light source 5 located facing the illumination light-introducing transparent medium 15.

In the Fresnel reflecting mirror 30, a refracting surface 31 located on the exit pupil 1 side is made up of a free-form surface, and a Fresnel reflecting surface on a back surface 32 side is made up of a rotationally symmetric aspheric surface.

The decentered prism 10 has a Y-Z plane as a symmetric plane, and consists of four surfaces, i.e., a first surface 11 that is an entrance surface, a second surface 12 that is a first reflecting surface, a third surface 13 that is a second reflecting surface and a fourth surface 14 that is an exit surface.

Through the first surface 11 that faces the reflection type display device 3, display light (projection light) enters the prism. The second surface 12 reflects light entered from the first surface 11 in the prism, and the third surface 13 reflects display light reflected at the second surface 12. Through the fourth surface 14, the display light reflected at the third surface 13 leaves the prism.

The respective surfaces of the prism are located such that an optical axis 2 of projection light from the first surface 11 toward the second surface 12 crosses the optical axis 2 of projection light from the third surface 13 to the fourth surface 14 in the prism.

The illumination light-introducing transparent medium 15 is joined (or bonded) to a part of the third surface 13 of the decentered prism 10. In another parlance, the illumination light-introducing transparent medium 15 is integrated with the decentered prism 10. A surface 16 of the illumination light-introducing transparent medium 15 facing the illumination light source 5 is a Fresnel transmitting surface formed of a spherical surface. Illumination light enters the decentered prism 10 via the illumination light-introducing transparent medium 15. Thus, the decentered prism 10 also functions as an illumination optical system.

Leaving the illumination light source 5, the illumination light enters the surface 16 of the illumination light-introducing transparent medium 15, and passes through the surface 16 and then the illumination light-introducing transparent medium 15, arriving at a cemented surface of the decentered prism 10 with the transparent medium 15. This cemented surface forms a part of the third surface 13 of the decentered prism 10, and is provided with a semi-transmitting surface (half-silvered mirror). In this way, the illumination light enters the decentered prism 10 via that cemented surface. Subsequently, the illumination light is reflected at the first reflecting surface 12, and leaves the prism through the first surface 11, illuminating the reflection type display device 3.

An image appears on the reflection type display device 3. Here, the illumination light is modulated depending on the state of the image displayed. Regular reflection light from the reflection type display device 3 provides display light, which then enters the decentered prism 10 through the first surface 11. The display light is reflected at the second surface 12 and then at the third surface 13. Then, the reflected light leaves the prism through the fourth surface 14, forming an image near the Fresnel reflecting mirror 30 by virtue of the positive power of the decentered prism 10. More specifically, an image of the image appearing on the reflection type display device 3 (the first-mentioned image is called hereinafter the intermediate image) is formed near the Fresnel reflecting mirror 32.

The intermediate image is then magnified and projected by the positive power of the Fresnel reflecting mirror 30. At the same time, the Fresnel reflecting mirror 30 forms an image of the exit pupil of the decentered-prism 10 at the position of the exit pupil 1. The power of the optical system between the decentered prism 10 and the illumination light source 5 is determined such that the exit pupil of the decentered prism 10 is conjugate to the illumination light source 5. Thus, the exit pupil 1, too, is conjugate to the illumination light source 5, so that the light modulated at the reflection type display device 3 after leaving the illumination light source 5 is all converged to the position of the exit pupil 1, whereby bright images can be viewed at lower power consumption rates.

In this example, the first surface 11 functions as a transmitting surface for transmitting both illumination light and projection light, and the second surface 12 functions as a reflecting surface for reflecting both illumination light and projection light.

The third surface 13 has both functions, one of transmitting illumination light and another of reflecting projection light. To achieve two such functions, the third surface 13 is constructed of a common surface having a transmitting area and a reflecting area located near it. The transmitting area for illumination light and the reflecting area for projection light are completely separated from each other in the direction of the symmetric plane (Y-Z plane) of the decentered prism 10.

In the instant example, any one of the surfaces provides a common surface shared by the illumination optical system and the relay optical system.

In the instant example, the optical axis 4 of illumination light from the illumination light source 5 to the reflection type display device 3 and the optical axis 2 of projection light from the reflection type display device 3 to the exit pupil 1 lie within the symmetric Y-Z plane.

Each of the respective surfaces 11 to 14 of the decentered prism 10 in the instant example is formed of a decentered free-form surface.

Constituting parameters for the display optical system 20 in the instant example will be referred to later.

EXAMPLE 2

This example is directed to a display optical system having a horizontal angle of view of 20° and a vertical angle of view of 15°. An exit pupil diameter is φ10 mm and a distance from an exit pupil 1 (corresponding to the eyeball position of a viewer) to an image formed through a relay optical system 21 is 40 cm. A 3.9×2.9 mm reflection type display device 3 is used.

In the instant example, additional decentration is imparted to the decentered prism 10 of Example 1 in another direction. This direction of additional decentration is vertical to the symmetric plane of the decentered prism 10 in Example 1, so that three-dimensional decentration is given to the decentered prism 10. This in turn allows the effective diameter of an illumination light beam on a third surface 13 of the decentered prism 10 to be separated from the effective diameter of a projection light beam thereon in the direction of additional decentration (vertical to the symmetric plane), so that the third surface 13 provides a common transmitting/reflecting surface.

Figure 4:
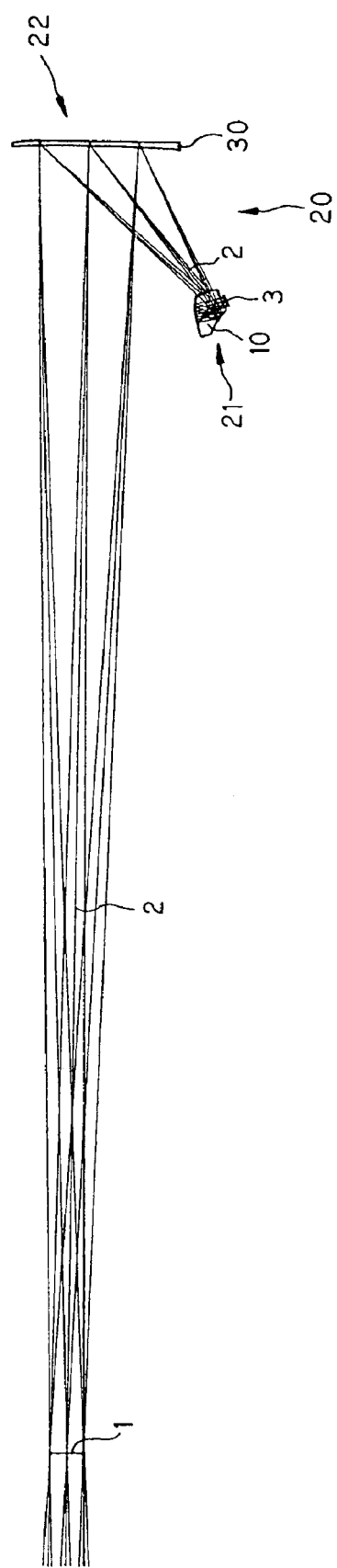
FIG. 4 is illustrative in section of the whole arrangement of Example 2 of the display optical system according to the invention.
Figure 5:
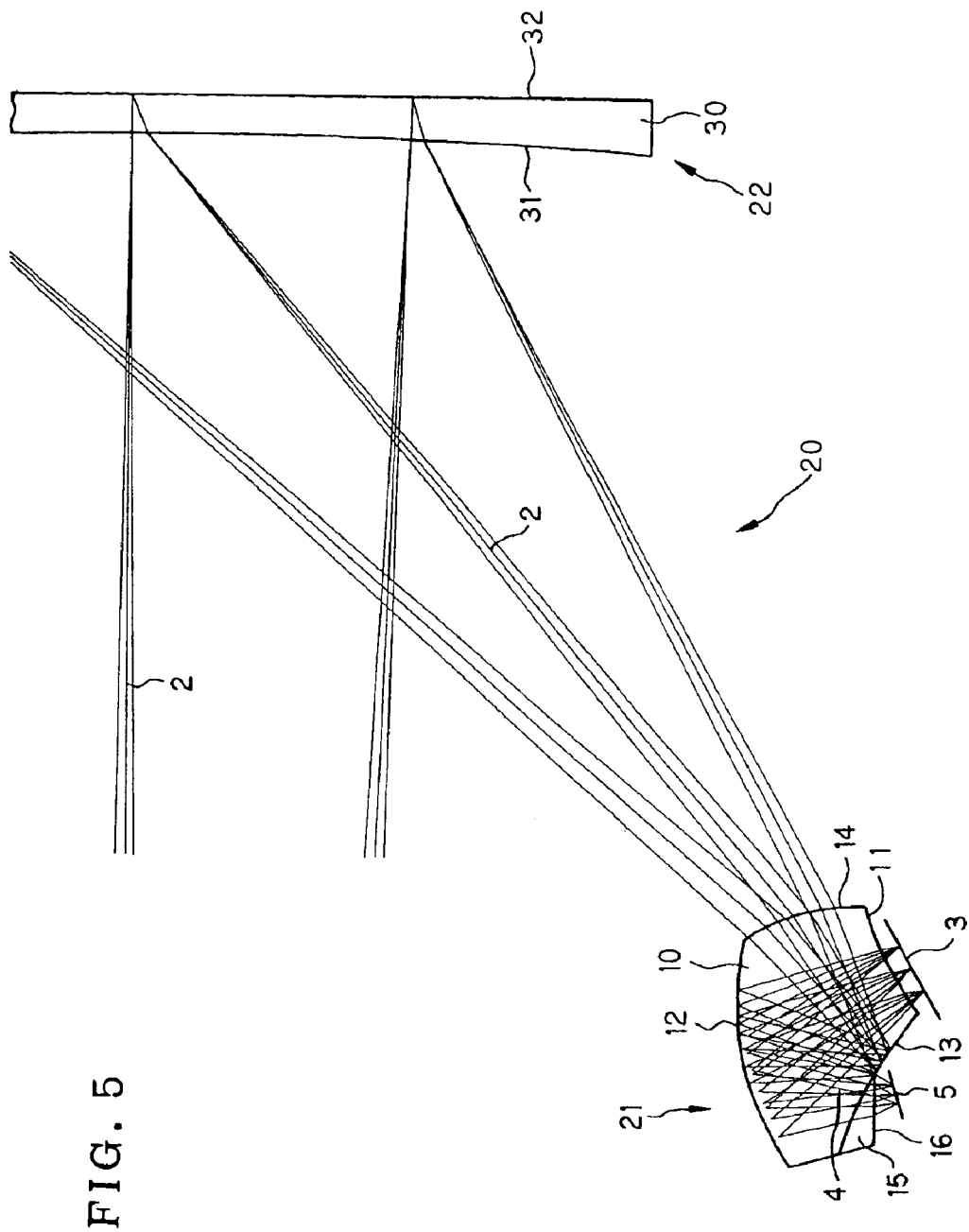
FIG. 5 is a partly enlarged view of part of the display optical system shown in FIG. 4.
Figure 6:
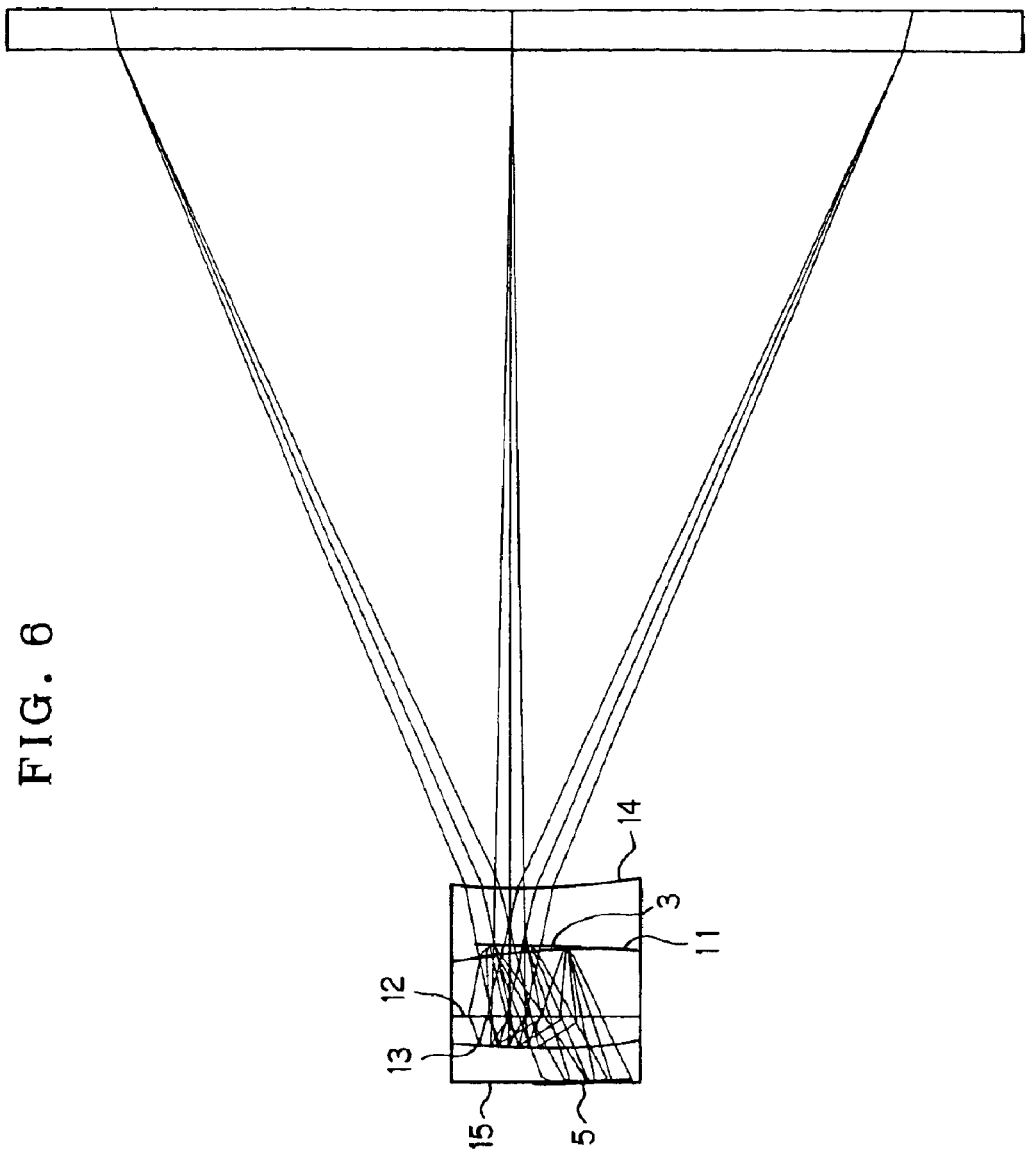
FIG. 6 is an optical path as projected for part of Example 2 of the display optical system.

FIG. 4 is an optical path diagram in a Y-Z plane for the whole arrangement from an exit pupil 1 to a display optical system 20. However, it is noted that an illumination optical path, i.e., an optical path from an illumination light source 5 to the decentered prism 10 for a relay optical system 21 is omitted. FIG. 5 is a partly enlarged view of the display optical system 20 portion in FIG. 4, and FIG. 6 is an optical path for the display optical system 20 portion as projected onto an X-Z plane.

In the display optical system 20 according to this example, too, the decentered prism 10 is used as the relay optical system 21. The decentered prism 10, because of having a decentered optical surface, provides a decentered prism optical system. According to one form of the display optical system 20 of this example, the decentered prism 10 has no symmetric plane.

As viewed in order of back ray tracing from the exit pupil 1 side, the display optical system according to the instant example is made up of a Fresnel reflecting mirror 30 that forms an eyepiece optical system 22, a decentered prism 10 that forms a relay optical system 21, a reflection type display device 3 located facing a first surface 11 of the decentered prism 10, an illumination light-introducing transparent medium 15 bonded to a part of a third surface 13 of the decentered prism 10 and an illumination light source 5 located facing the illumination light-introducing transparent medium 15.

In the Fresnel reflecting mirror 30, a refracting surface 31 located on the exit pupil 1 side is made up of a free-form surface, and a Fresnel reflecting surface on a back surface 32 side is made up of a rotationally symmetric aspheric surface. The decentered prism 10 consists of four surfaces, i.e., a first surface 11 that forms an entrance surface 12 that forms a first reflecting surface, a third surface 13 that forms a second reflecting surface and a fourth surface 14 that forms an exit surface.

Through the first surface 11 that faces the reflection type display device 3, display light (projection light) enters the prism. The second surface 12 reflects light entered from the first surface 11 in the prism, and the third surface 13 reflects display light reflected at the second surface 12. Through the fourth surface 14, the display light reflected at the third surface 13 leaves the prism.

The respective surfaces of the prism are located such that an optical axis 2 of projection light from the first surface 11 toward the second surface 12 crosses the optical axis 2 of projection light from the third surface 13 to the fourth surface 14 in the prism. It is here noted that two such optical axes cross each other in a twisted relation, so that upon another optical axis projected onto a plane including one optical axis, they cross each other.

The illumination light-introducing transparent medium 15 is joined (or bonded) to a part of the third surface 13 of the decentered prism 10. In another parlance, the illumination light-introducing transparent medium 15 is integrated with the decentered prism 10. A surface 16 of the illumination light-introducing transparent medium 15 facing the illumination light source 5 is a Fresnel transmitting surface formed of a spherical surface. Illumination light enters the decentered prism 10 via the illumination light-introducing transparent medium 15. Thus, the decentered prism 10 also functions as an illumination optical system.

Leaving the illumination light source 5, the illumination light enters the surface 16 of the illumination light-introducing transparent medium 15, and passes through the surface 16 and then the illumination light-introducing transparent medium 15, arriving at a cemented surface of the decentered prism 10 with the transparent medium 15. This cemented surface forms a part of the third surface 13 of the decentered prism 10; however, no reflecting layer (reflecting film) is provided on that cemented surface. In this way, the illumination light enters the decentered prism 10 via that cemented surface. Subsequently, the illumination light is reflected at the first reflecting surface 12, and leaves the prism through the first surface 11, illuminating the reflection type display device 3.

An image appears on the reflection type display device 3. Here, the illumination light is modulated depending on the state of the image displayed. Regular reflection light from the reflection type display device 3 provides display light, which then enters the decentered prism 10 through the first surface 11. The display light is reflected at the second surface 12 and then at the third surface 13. Then, the reflected light leaves the prism through the fourth surface 14, forming an image near the Fresnel reflecting mirror 30 by virtue of the positive power of the decentered prism 10. More specifically, an intermediate image is formed near the Fresnel reflecting mirror 32.

The intermediate image is then magnified and projected by the positive power of the Fresnel reflecting mirror 30. At the same time, the Fresnel reflecting mirror 30 forms an image of the exit pupil of the decentered prism 10 at the position of the exit pupil 1. The power of the optical system between the decentered prism 10 and the illumination light source 5 is determined such that the exit pupil of the decentered prism 10 is conjugate to the illumination light source 5. Thus, the exit pupil 1, too, is conjugate to the illumination light source 5, so that the light modulated at the reflection type display device 3 after leaving the illumination light source 5 is all converged to the position of the exit pupil 1, whereby bright images can be viewed at lower power consumption rates.

In this example, the first surface 11 functions as a transmitting surface for transmitting both illumination light and projection light, and the second surface 12 functions as a reflecting surface for reflecting both illumination light and projection light.

The third surface 13 has both functions, one of transmitting illumination light and another of reflecting projection light. To achieve two such functions, the third surface 13 is constructed of a common surface having a transmitting area and a reflecting area located near it. The transmitting area for illumination light and the reflecting area for projection light are separated from each other in the direction of the symmetric plane (Y-Z plane) of the decentered prism 10.

In the instant example, any one of the surfaces provides a common surface shared by the illumination optical system and the relay optical system.

In the instant example, the optical axis 4 of illumination light from the illumination light source 5 to the reflection type display device 3 and the optical axis 2 of projection light from the reflection type display device 3 to the exit pupil 1 do not lie within the symmetric Y-Z plane. decentered prism 10 in the instant example is formed of a decentered free-form surface.

Constituting parameters for the display optical system 20 in the instant example will be referred to later.

EXAMPLE 3

This example is directed to a display optical system having a horizontal angle of view of 20° and a vertical angle of view of 15°. An exit pupil diameter is φ10 mm and a distance from an exit pupil 1 (corresponding to the eyeball position of a viewer) to an image formed through a relay optical system 21 is 40 cm. A 3.9×2.9 mm reflection type display device 3 is used. In the instant example, the second surface 12 of a decentered prism 10 is defined by a reflecting surface of the relay optical system and a transmitting surface of an illumination optical system. That surface used herein is formed of a half-silvered mirror or a polarization beam splitter.

Figure 7:
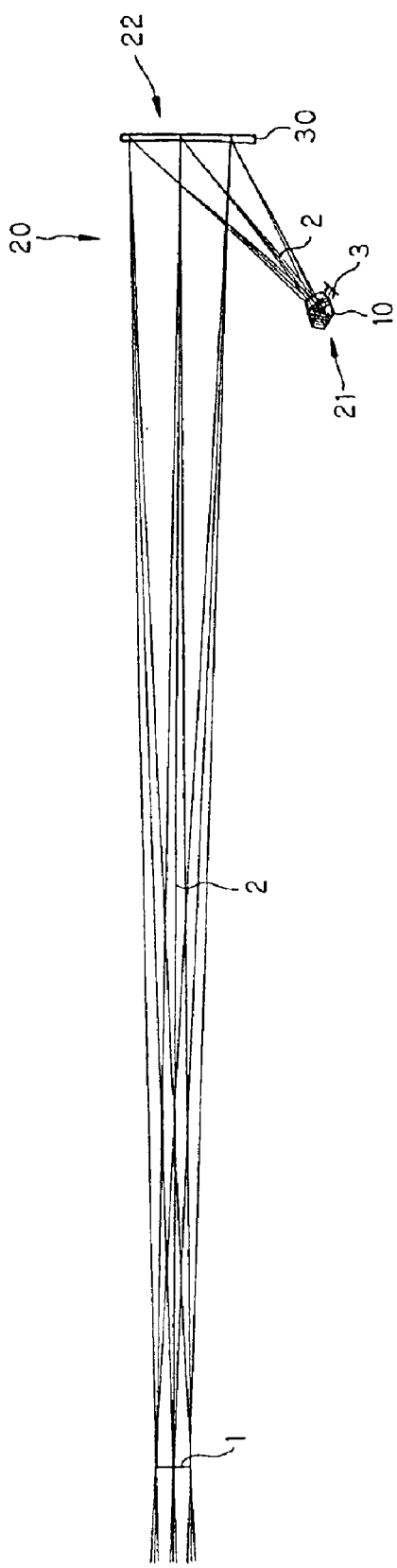
FIG. 7 is illustrative in section of the whole arrangement of Example 3 of the display optical system according to the invention.
Figure 8:
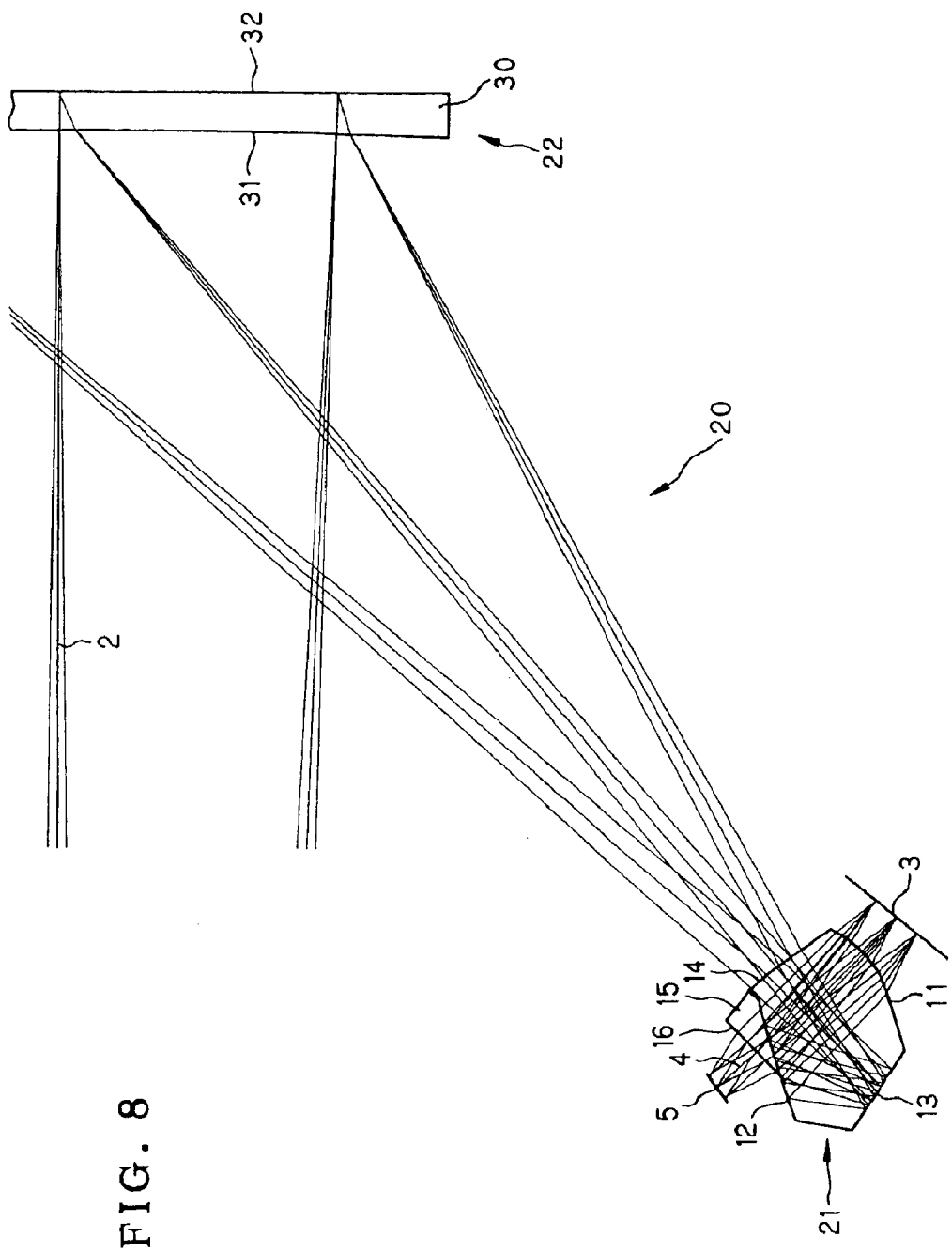
FIG. 8 is a partly enlarged view of part of the display optical system shown in FIG. 7.
Figure 9:
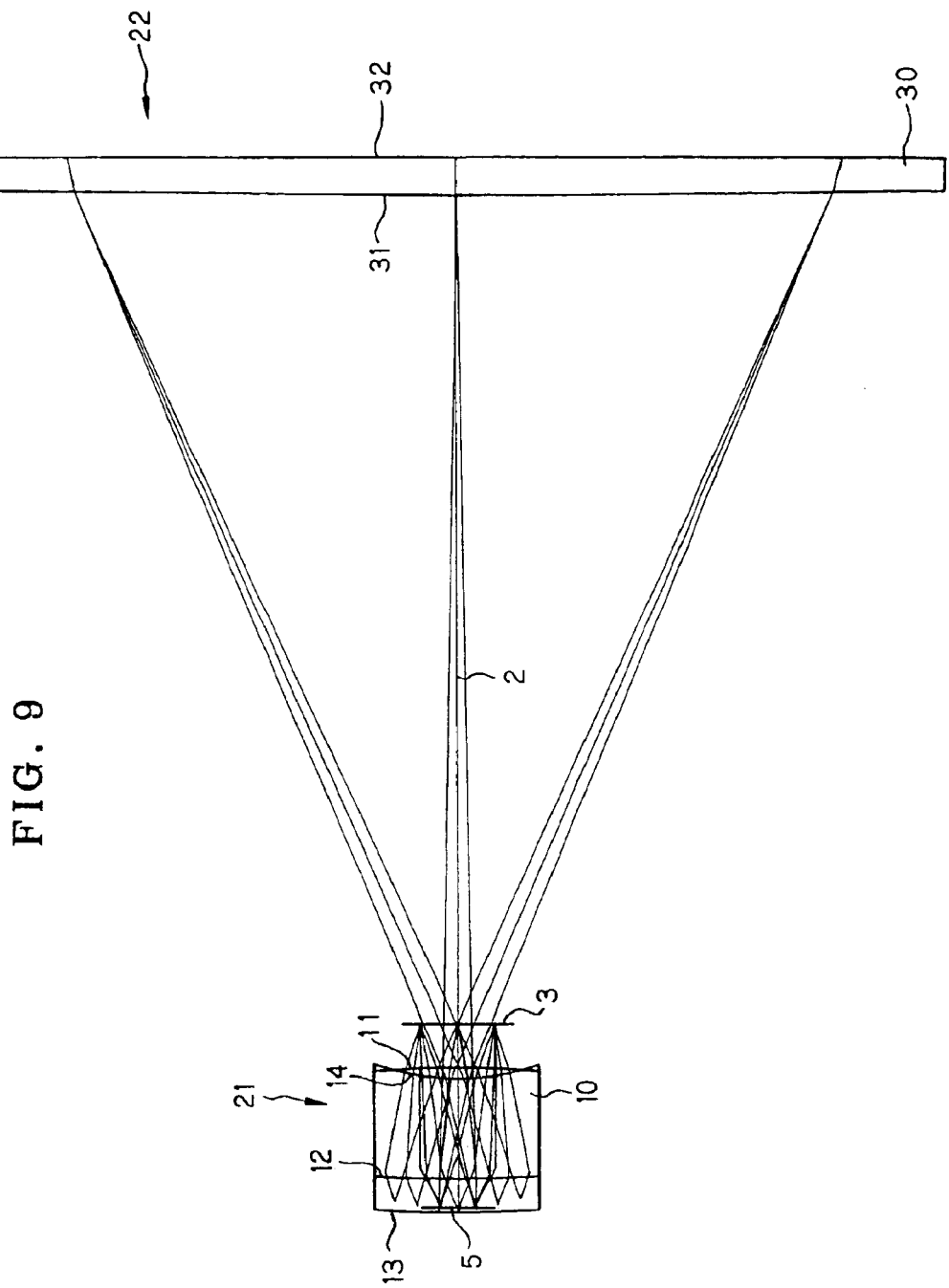
FIG. 9 is an optical path as projected for part of Example 3 of the display optical system.

FIG. 7 is an optical path diagram in a Y-Z plane for the whole arrangement from the exit pupil 1 to the display optical system 20. However, it is noted that an illumination optical path, i.e., an optical path from an illumination light source 5 to the decentered prism 10 for the relay optical system 21 is omitted. FIG. 8 is a partly enlarged view of the display optical system 20 portion in FIG. 7, and FIG. 9 is an optical path for the display optical system 20 portion as projected onto an X-Z plane. plane.

In the display optical system 20 according to this example, the decentered prism 10 is used as the relay optical system 21. The decentered prism 10, because of having a decentered optical surface, provides a decentered prism optical system, and has a Y-Z plane as a symmetric plane.

As viewed in order of back ray tracing from the exit pupil 1 side, the display optical system according to the instant example is made up of a Fresnel reflecting mirror 30 that forms an eyepiece optical system 22, a decentered prism 10 that forms a relay optical system 21, a reflection type display device 3 located facing a first surface 11 of the decentered prism 10, an illumination light-introducing transparent medium 15 bonded to a part of a second surface 12 of the decentered prism 10 and an illumination light source 5 located facing the illumination light-introducing transparent medium 15.

In the Fresnel reflecting mirror 30, a refracting surface 31 located on the exit pupil 1 side is made up of a free-form surface, and a Fresnel reflecting surface on a back surface 32 side is made up of a rotationally symmetric aspheric surface. The decentered prism 10 consists of four surfaces, i.e., a first surface 11 that is an entrance surface, a second surface 12 that is a first reflecting surface, a third surface 13 that is a second reflecting surface and a fourth surface 14 that is an exit surface.

Through the first surface 11 that faces the reflection type display device 3, display light (projection light) enters the prism. The second surface 12 reflects light entered from the first surface 11 in the prism, and the third surface 13 reflects display light reflected at the second surface 12. Through the fourth surface 14, the display light reflected at the third surface 13 leaves the prism.

The respective surfaces of the prism are located such that an optical axis 2 of projection light from the first surface 11 toward the second surface 12 crosses the optical axis 2 of projection light from the third surface 13 to the fourth surface 14 in the prism.

The illumination light-introducing transparent medium 15 is joined (or bonded) to a part of the third surface 13 of the decentered prism 10. In another parlance, the illumination light-introducing transparent medium 15 is integrated with the decentered prism 10. A surface 16 of the illumination light-introducing transparent medium 15 facing the illumination light source 5 is a Fresnel transmitting surface formed of a spherical surface. Illumination light enters the decentered prism 10 via the illumination light-introducing transparent medium 15. Thus, the decentered prism 10 also functions as an illumination optical system.

Leaving the illumination light source 5, the illumination light enters the surface 16 of the illumination light-introducing transparent medium 15, and passes through the surface 16 and then the illumination light-introducing transparent medium 15, arriving at a cemented surface of the decentered prism 10 with the transparent medium 15. This cemented surface forms a part of the second surface 12 of the decentered prism 10, and is provided with no reflecting layer (reflecting film). In this way, the illumination light enters the decentered prism 10 via that cemented surface. Subsequently, the illumination light leaves the prism through the first surface 11, illuminating the reflection type display device 3.

An image appears on the reflection type display device 3. Here, the illumination light is modulated depending on the state of the image displayed. Regular reflection light from the reflection type display device 3 provides display light, which then enters the decentered prism 10 through the first surface 11. The display light is reflected at the second surface 12 and then at the third surface 13. Then, the reflected light leaves the prism through the fourth surface 14, forming an image near the Fresnel reflecting mirror 30 by virtue of the positive power of the decentered prism 10. More specifically, an intermediate image of the image appearing on the reflection type display device 3 is formed near the Fresnel reflecting mirror 32. As can be seen from FIG. 8, on the second surface 12, some light beams of the illumination light and some light beams of the display light overlap. Therefore, the second surface 12 is provided thereon with the half-silvered mirror surface as described above.

The intermediate image is then magnified and projected by the positive power of the Fresnel reflecting mirror 30. At the same time, the Fresnel reflecting mirror 30 forms an image of the exit pupil of the decentered prism 10 at the position of the exit pupil 1. The power of the optical system between the decentered prism 10 and the illumination light source 5 is determined such that the exit pupil of the decentered prism 10 is conjugate to the illumination light source 5. Thus, the exit pupil 1, too, is conjugate to the illumination light source 5, so that the light modulated at the reflection type display device 3 after leaving the illumination light source 5 is all converged to the position of the exit pupil 1, whereby bright images can be viewed at lower power consumption rates.

In this example, the first surface 11 functions as a transmitting surface for transmitting both illumination light and projection light, and the second surface 12 functions as a reflecting surface for reflecting both illumination light and projection light.

The third surface 12 has both functions, one of transmitting illumination light and another of reflecting projection light. To achieve two such functions, the third surface 12 is constructed of a common surface having a half-silvered mirror surface. The transmitting area for illumination light and the reflecting area for projection light are partly separated from each other in the direction of the symmetric plane (Y-Z plane) of the decentered prism 10.

In the instant example, any one of the surfaces provides a common surface shared by the illumination optical system and the relay optical system.

In the instant example, the optical axis 4 of illumination light from the illumination light source 5 to the reflection type display device 3 and the optical axis 2 of projection light from the reflection type display device 3 to the exit pupil 1 lie within the symmetric Y-Z plane.

Each of the respective surfaces 11 to 14 of the decentered prism 10 in the instant example is formed of a decentered free-form surface.

Constituting parameters for the display optical system 20 in the instant example will be referred to later.

EXAMPLE 4

This example is directed to a display optical system having a horizontal angle of view of 20° and a vertical angle of view of 15°. An exit pupil diameter is φ10 mm and a distance from an exit pupil 1 (corresponding to the eyeball position of a viewer) to an image formed through a relay optical system 21 is 40 cm. A 3.9×2.9 mm reflection type display device 3 is used.

In the instant example, additional decentration is imparted to the decentered prism 10 of Example 1 in another direction. This direction of additional decentration is vertical to the symmetric plane of the decentered prism 10 in Example 1, so that three-dimensional decentration is given to the decentered prism 10. This in turn allows the effective diameter of an illumination light beam on a fourth surface 14 of the decentered prism 10 to be separated from the effective diameter of a projection light beam thereon in the direction of additional decentration (vertical to the symmetric plane), so that the fourth surface 14 provides a common transmitting/reflecting surface.

Figure 10:
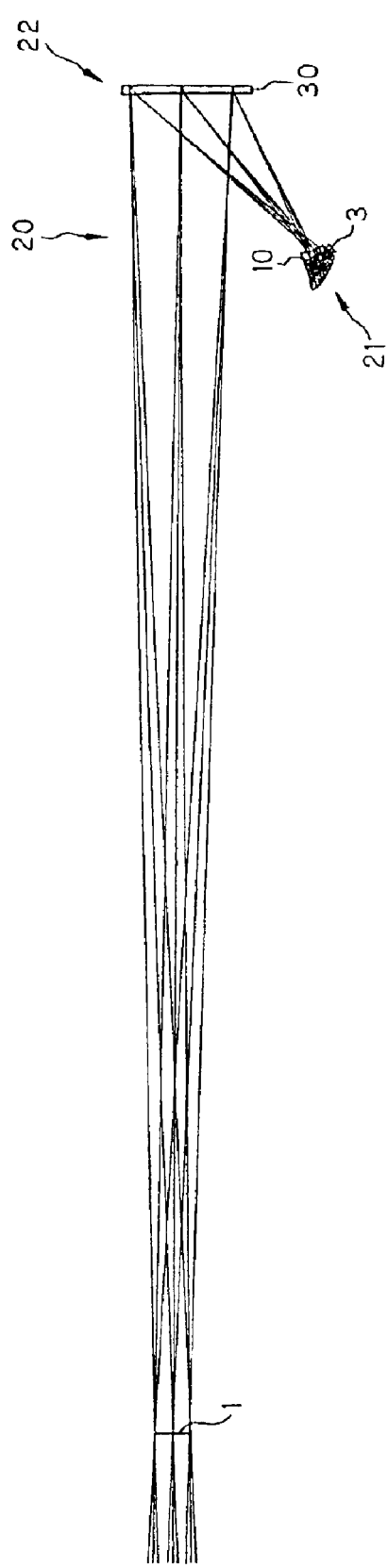
FIG. 10 is illustrative in section of the whole arrangement of Example 4 of the display optical system according to the invention.
Figure 11:
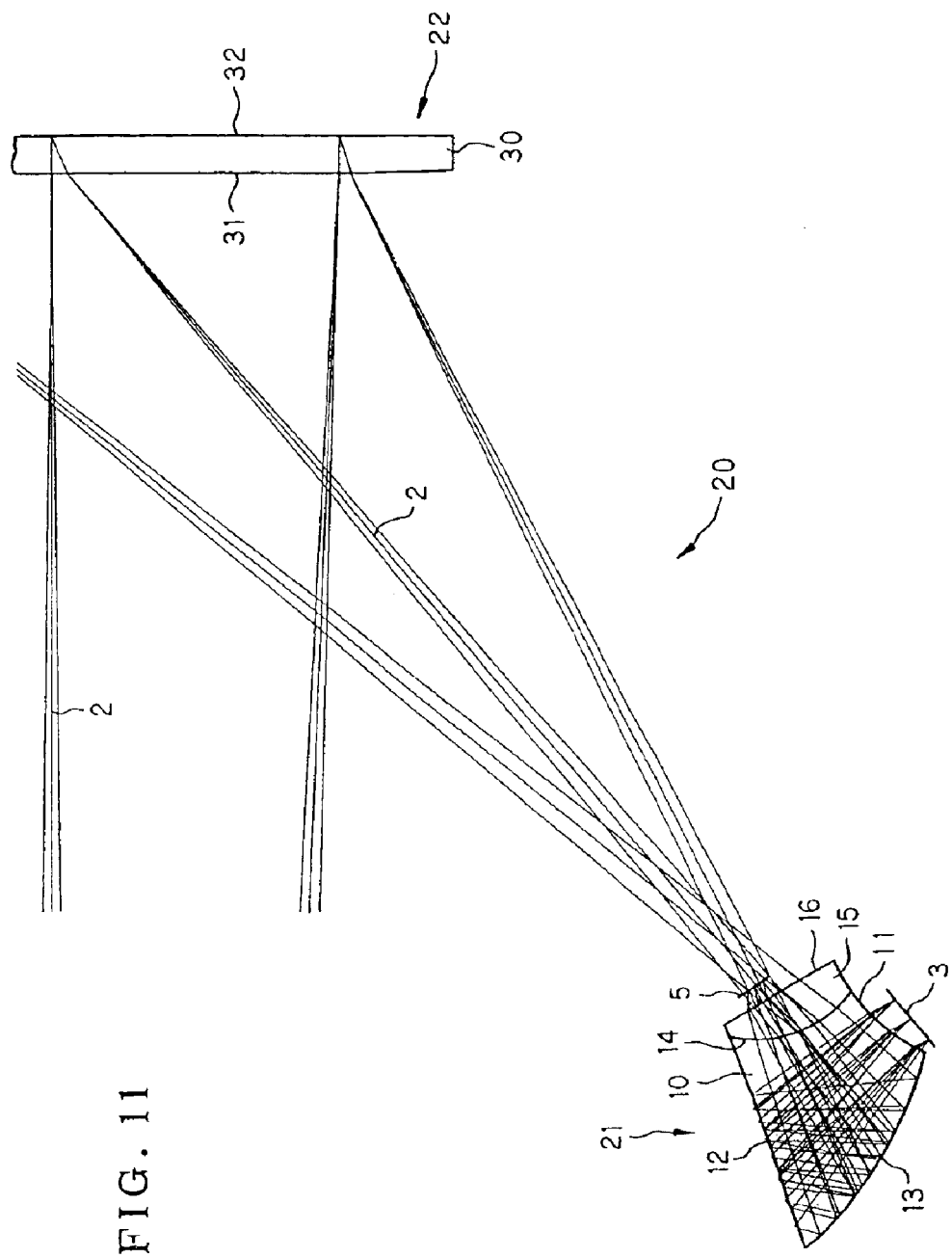
FIG. 11 is a partly enlarged view of part of the display optical system shown in FIG. 10.
Figure 12:
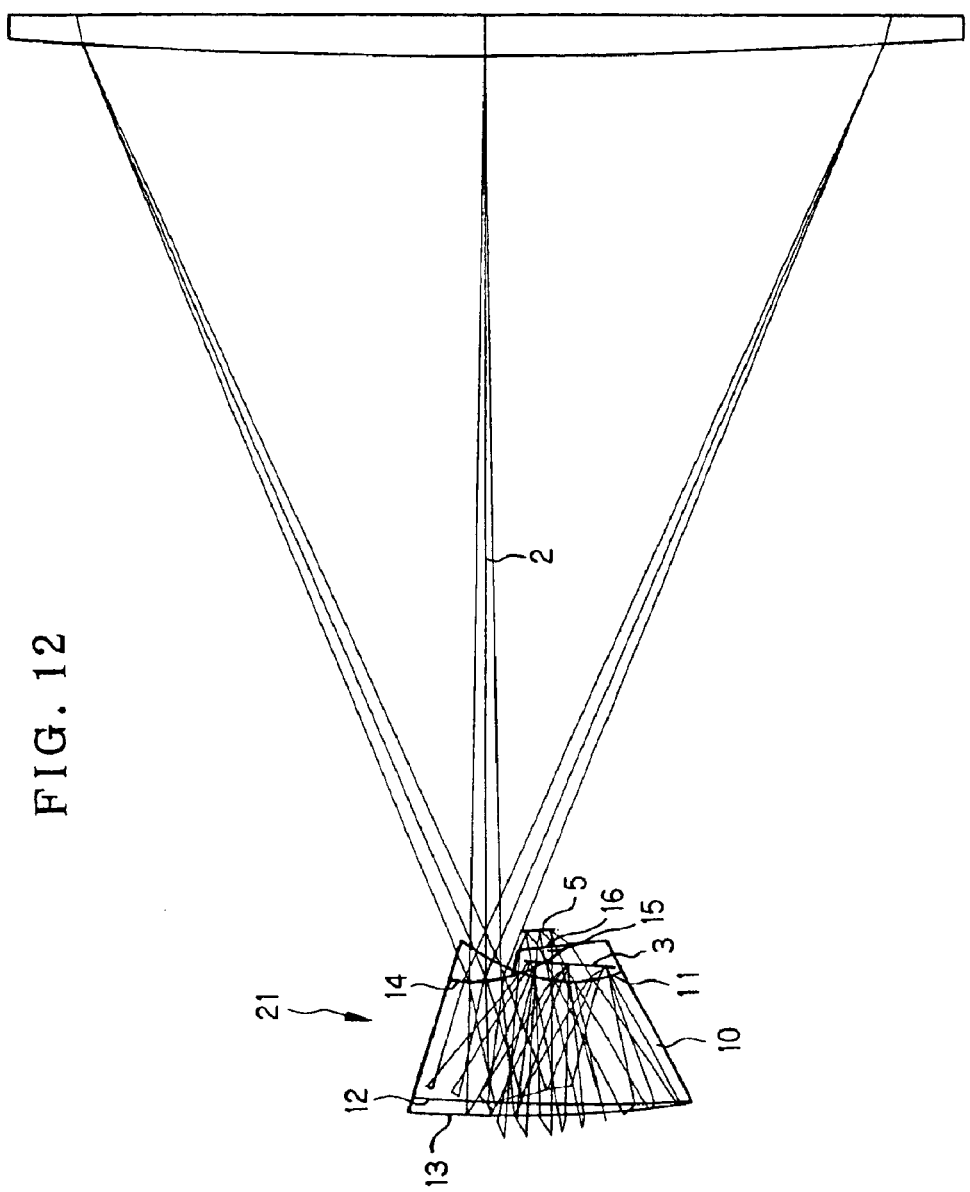
FIG. 12 is an optical path as projected for part of Example 4 of the display optical system.
Figure 13:
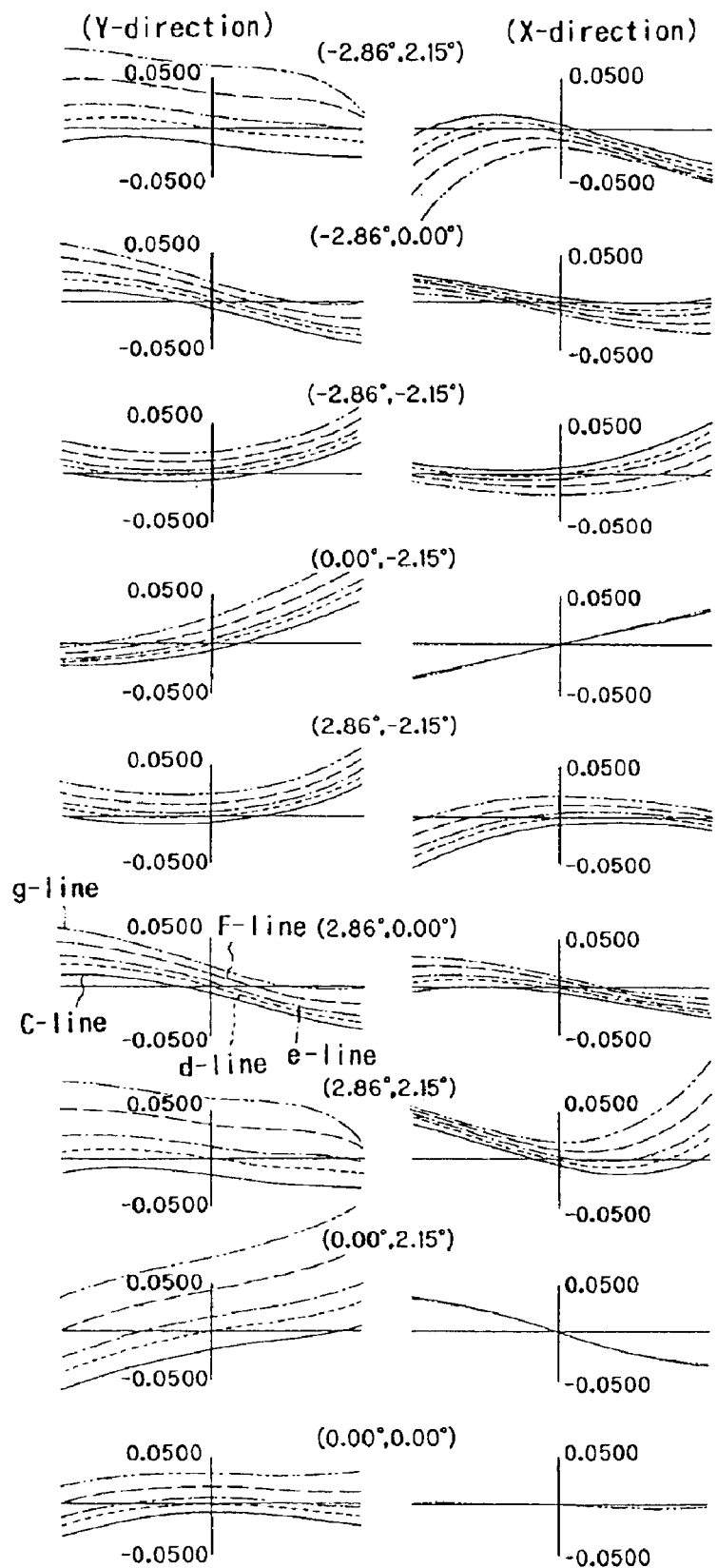
FIG. 13 is illustrative of transverse aberrations of Example 1.
Figure 14:
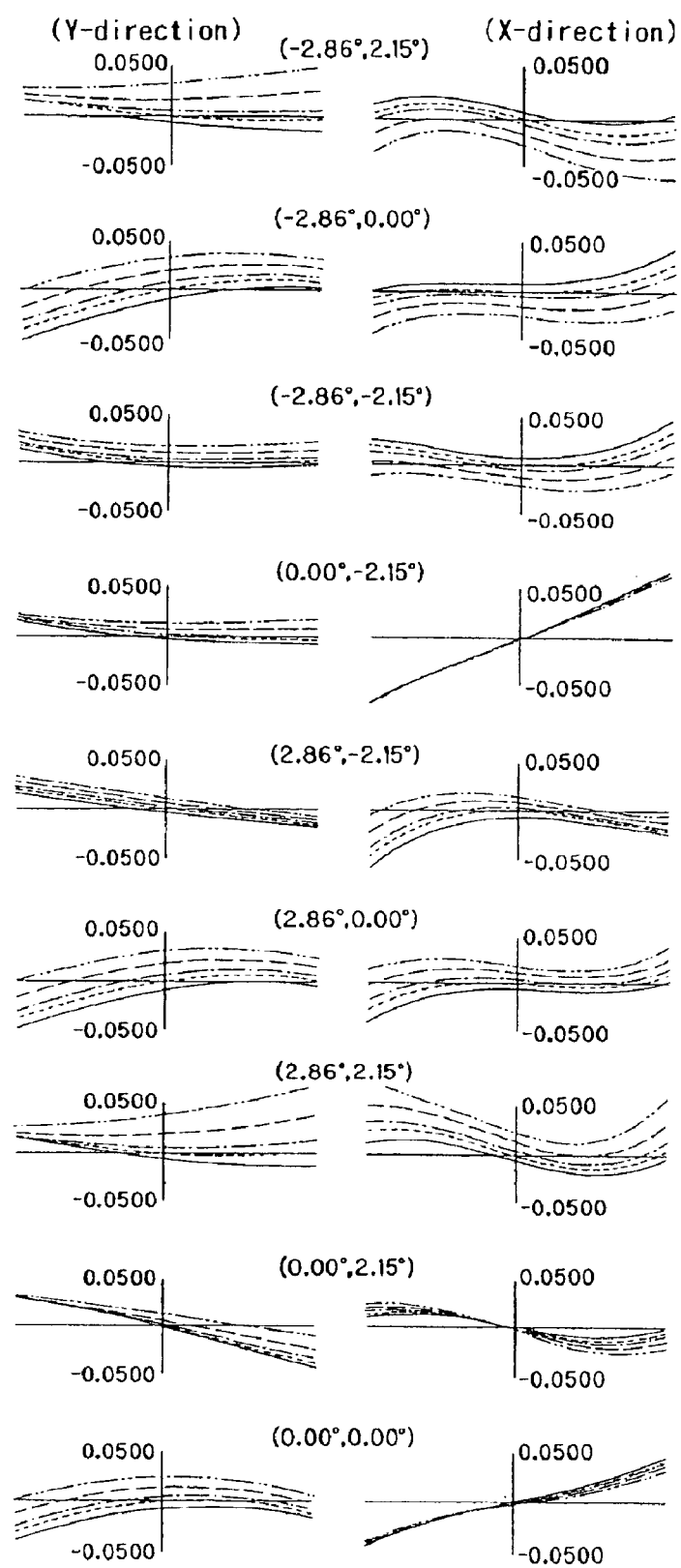
FIG. 14 is illustrative of transverse aberrations of Example 2.
Figure 15:
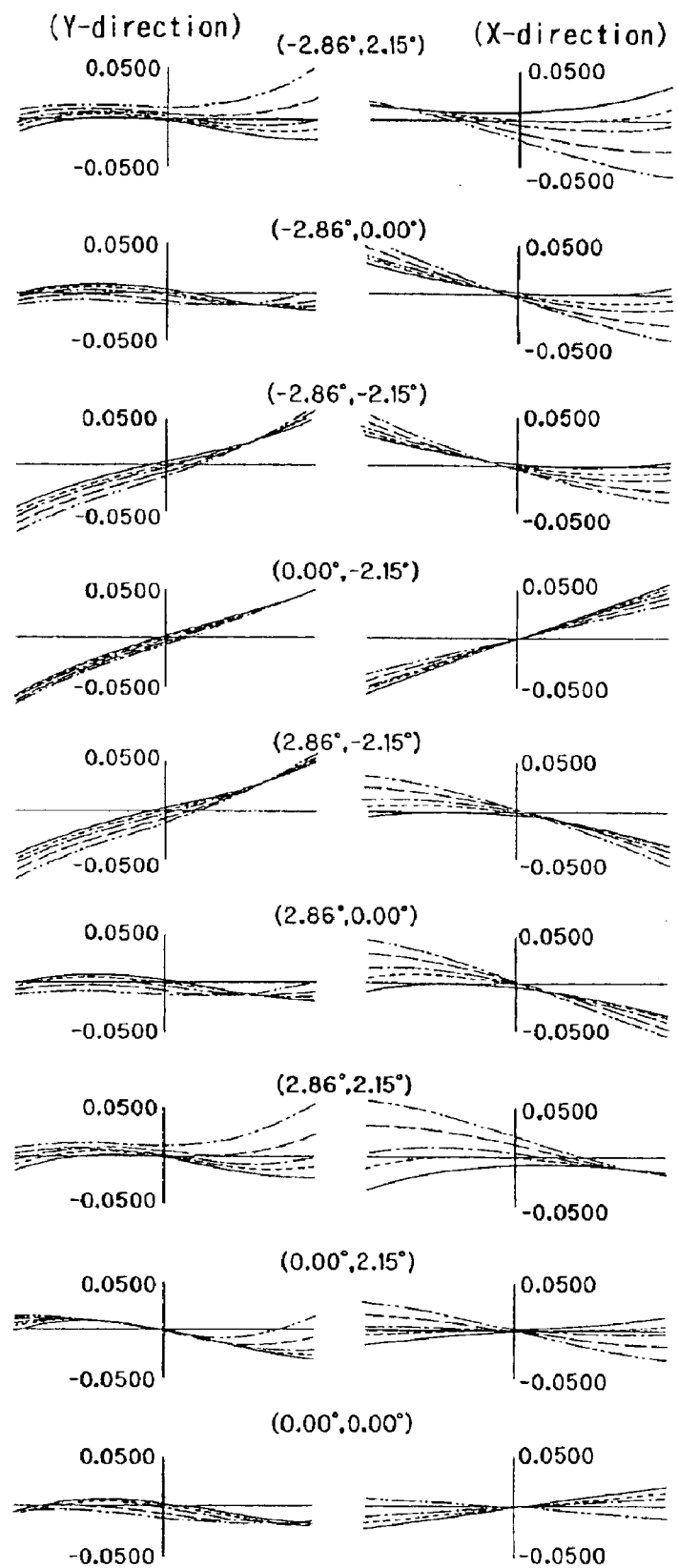
FIG. 15 is illustrative of transverse aberrations of Example 3.
Figure 16:
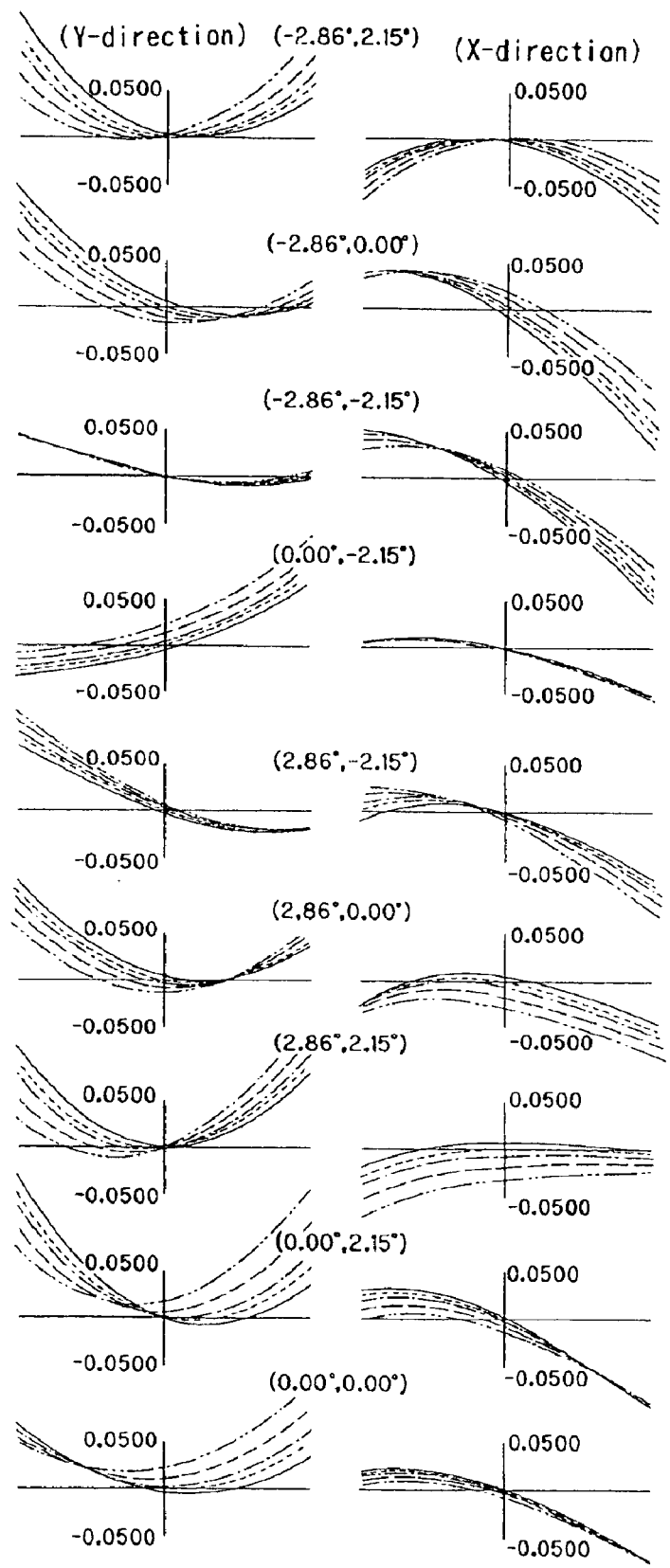
FIG. 16 is illustrative of transverse aberrations of Example 4.

FIG. 10 is an optical path diagram in a Y-Z plane for the whole arrangement from an exit pupil 1 to a display optical system 20. However, it is noted that an illumination optical path, i.e., an optical path from an illumination light source 5 to the decentered prism 10 for a relay optical system 21 is omitted. FIG. 11 is a partly enlarged view of the display optical system 20 portion in FIG. 10, and FIG. 12 is an optical path for the display optical system 20 portion as projected onto an X-Z plane.

In the display optical system 20 according to this example, too, the decentered prism 10 is used as the relay optical system 21. The decentered prism 10, because of having a decentered optical surface, provides a decentered prism optical system. According to one form of the display optical system 20 of this example, the decentered prism 10 has no symmetric plane.

As viewed in order of back ray tracing from the exit pupil 1 side, the display optical system according to the instant example is made up of a Fresnel reflecting mirror 30 that forms an eyepiece optical system 22, a decentered prism 10 that forms a relay optical system 21, a reflection type display device 3 located facing a first surface 11 of the decentered prism 10, an illumination light-introducing transparent medium 15 bonded to a part of a fourth surface 14 of the decentered prism 10 and an illumination light source 5 located facing the illumination light-introducing transparent medium 15.

In the Fresnel reflecting mirror 30, a refracting surface 31 located on the exit pupil 1 side is made up of a free-form surface, and a Fresnel reflecting surface on a back surface 32 side is made up of a rotationally symmetric aspheric surface. The decentered prism 10 consists of four surfaces, i.e., a first surface 11 that forms an entrance surface, a second surface 12 that forms a first reflecting surface, a third surface 13 that forms a second reflecting surface and a fourth surface 14 that forms an exit surface.

Through the first surface 11 that faces the reflection type display device 3, display light (projection light) enters the prism. The second surface 12 reflects light entered from the first surface 11 in the prism, and the third surface 13 reflects display light reflected at the second surface 12. Through the fourth surface 14, the display light reflected at the third surface 13 leaves the prism.

The respective surfaces of the prism are located such that an optical axis 2 of projection light from the first surface 11 toward the second surface 12 crosses the optical axis 2 of projection light from the third surface 13 to the fourth surface 14 in the prism. It is here noted that two such optical axes cross each other in a twisted relation, so that upon another optical axis projected onto a plane including one optical axis, they cross each other.

The illumination light-introducing transparent medium 15 is joined (or bonded) to a part of the fourth surface 14 of the decentered prism 10. In another parlance, the illumination light-introducing transparent medium 15 is integrated with the decentered prism 10. A surface 16 of the illumination light-introducing transparent medium 15 facing the illumination light source 5 is a Fresnel transmitting surface formed of a spherical surface. Illumination light enters the decentered prism 10 via the illumination light-introducing transparent medium 15. Thus, the decentered prism 10 also functions as an illumination optical system.

Leaving the illumination light source 5, the illumination light enters the surface 16 of the illumination light-introducing transparent medium 15, and passes through the surface 16 and then the illumination light-introducing transparent medium 15, arriving at a cemented surface of the decentered prism 10 with the transparent medium 15. This cemented surface forms a part of the fourth surface 14 of the decentered prism 10; however, no reflecting layer (reflecting film) is provided on that cemented surface. Thus, the illumination light enters the decentered prism 10 via that cemented surface. Subsequently, the illumination light is reflected at the second reflecting surface 13 and then the first reflecting surface 12, and leaves the prism through the first surface 11, illuminating the reflection type display device 3.

An image appears on the reflection type display device 3. Here, the illumination light is modulated depending on the state of the image displayed. Regular reflection light from the reflection type display device 3 provides display light, which then enters the decentered prism 10 through the first surface 11. The display light is reflected at the second surface 12 and then at the third surface 13. Then, the reflected light leaves the prism through the fourth surface 14, forming an image near the Fresnel reflecting mirror 30 by virtue of the positive power of the decentered prism 10. More specifically, an intermediate image is formed near the Fresnel reflecting mirror 32.

The intermediate image is then magnified and projected by the positive power of the Fresnel reflecting mirror 30. At the same time, the Fresnel reflecting mirror 30 forms an image of the exit pupil of the decentered prism 10 at the position of the exit pupil 1. The power of the optical system between the decentered prism 10 and the illumination light source 5 is determined such that the exit pupil of the decentered prism 10 is conjugate to the illumination light source 5. Thus, the exit pupil 1, too, is conjugate to the illumination light source 5, so that the light modulated at the reflection type display device 3 after leaving the illumination light source 5 is all converged to the position of the exit pupil 1, whereby bright images can be viewed at lower power consumption rates.

In this example, the first surface 11 functions as a transmitting surface for transmitting projection light, and the second surface 12 and the third surface 13 function as a reflecting surface for reflecting both illumination light and projection light.

The fourth surface 14 has both functions, one of transmitting illumination light and another of reflecting projection light. To achieve two such functions, the fourth surface 14 is constructed of a common surface having a transmitting area and a reflecting area located near it. The transmitting area for illumination light and the reflecting area for projection light are separated from each other in the direction of the symmetric plane (Y-Z plane) of the decentered prism 10.

In the instant example, any one of the surfaces provides a common surface shared by the illumination optical system and the relay optical system.

In the instant example, the optical axis 4 of illumination light from the illumination light source 5 to the reflection type display device 3 and the optical axis 2 of projection light from the reflection type display device 3 to the exit pupil 1 do not lie within the symmetric Y-Z plane.

Each of the respective surfaces 11 to 14 of the decentered prism 10 in the instant example is formed of a decentered free-form surface.

Constituting parameters for the display optical system 20 in the instant example will be referred to later.

The values of constituting parameters of the display optical system 20 in Examples 1–4 are now given, as obtained upon back ray tracing. Back ray tracing is performed in the order of a ray from the position of the exit pupil 1 of the display optical system 20 (the viewer's pupil) toward the illumination light source 5 via the reflection type display device 3. The optical axis 2 of projection light is defined by a light ray that passes vertically through the center of the exit pupil 1 of the display optical system 20 to the center of the reflection type display device 3, and the optical axis 4 of illumination light is defined by a light ray that, as viewed in back ray tracing, passes through the center of the reflection type display device 3 to the center of the illumination light source 5.

For back ray tracing, the origin of the decentered optical surface of the decentered optical system is defined as the center of the exit pupil 1. The positive direction for the Z-axis is defined by the direction along which the optical axis 2 of projection light runs from that origin toward the final surface that faces the exit pupil 1 of the display optical system 20 (the exit surface 31 of the eyepiece optical system 22 in FIGS. 1, 2 and 3). The surface of the paper of FIG. 1 defines the Y-Z plane. The positive direction for the X-axis is defined by a direction that passes through the origin, intersects at right angles with the Y-Z plane and passes through the paper of FIG. 1 from its front surface, and the Y-axis is defined by an axis that forms a right-hand orthogonal coordinate system with the X- and Z-axes.

For the decentered surface, there are given the amount of decentration of its apex from the origin of the optical system and the angles of inclination of its center axis around the X-, Y- and Z-axes ($\alpha$, $\beta$, $\gamma$(°)). Here the amounts of decentration in the X-, Y- and Z-axis directions are referred to as X, Y and Z. The center axis is defined by the Z-axis of the aforesaid formula (a) for the free-form.

In that case, the positive for $\alpha$ and $\beta$ means counterclockwise rotation with respect to the positive direction of the respective axes, and the positive for $\gamma$ means clockwise rotation with respect to the positive direction of the Z-axis. For $\alpha$, $\beta$ and $\gamma$ rotation of the center axis of the surface, the center axis of the surface and its XYZ orthogonal coordinate system are first counterclockwise rotated around the X-axis by $\alpha$. Then, the center axis of the rotated surface is counterclockwise rotated around the Y-axis of a new coordinate system by $\beta$ while the once rotated coordinate system is counterclockwise rotated around the Y-axis by $\beta$. Then, the center axis of the twice rotated surface is clockwise rotated around the Z-axis of a new coordinate system by $\gamma$.

When, of the optical surfaces that form the optical system in each example, a specific surface and the subsequent surface form a coaxial optical system, there is given a space between them. Besides, there are conventionally given the radius of curvature of each surface, and the refractive index and Abbe number of each medium.

The surface shape of the free-form surface used herein, for instance, is defined by formula (a) in U.S. Pat. No. 6,124,989 (JP-A 2000-66105), and the Z-axis of the defining formula (a) provides the axis of the free-form surface.

The aspheric surface is a rotationally symmetric aspheric surface given by the following defining formula:

$$Z = (y^2/R)/[1+\{1-(1+K)y^2/R^2\}^{1/2}] + Ay^4 + By^6 + Cy^8 + Dy^{10} + \ldots \quad (b)$$

where Z is an optical axis (axial chief ray) provided that the direction of propagation of light is positive, and y is in the direction vertical to the optical axis. Here R is a paraxial radius of curvature, K is a conical constant, and A, B, C, D, . . . are the 4th, 6th, 8th and 10th aspheric coefficients. The Z-axis in this defining formula provides an axis of the rotationally symmetric aspheric surface.

It is noted that the terms concerning the free-form surface and aspheric surface with no data given are zero. The refractive index is given on a d-line (587.56 nm wavelength) basis, and the length is given in mm.

The numerical data on Examples 1 to 4 are enumerated below. The symbols "FFS", "ASS", "RE" and "FR" stand for a free-form surface, an aspheric surface, a reflecting surface and a Fresnel surface, respectively. It is noted that the object plane and the image plane are defined by the plane of the image projected through the relay optical system 21 and the display screen surface of the reflection type display device 3, respectively.

EXAMPLE 1

| Surface No. | Radius of curvature | Surface Displacement separation and tilt | Refractive index | Abbe's No. |
|---|---|---|---|---|
| Object plane | ∞ | (1) | | |
| 1 | ∞ (Pupil) | | | |
| 2 | FFS① | (1) | 1.5254 | 56.2 |
| 3 | ASS① (FR, RE) | (2) | 1.5254 | 56.2 |
| 4 | FFS① | (1) | | |
| 5 | FFS② | (3) | 1.5254 | 56.2 |
| 6 | FFS③ (RE) | (4) | 1.5254 | 56.2 |
| 7 | FFS④ (RE) | (5) | 1.5254 | 56.2 |
| 8 | FFS⑤ | (6) | | |
| Image plane | ∞ | (7) | | |
| 10 | FFS⑤ | (6) | 1.5254 | 56.2 |
| 11 | FFS④ (RE) | (5) | 1.5254 | 56.2 |
| 12 | FFS③ | (4) | 1.5254 | 56.2 |
| 13 | 3.37 (FR) | (8) | | |
| Light source | ∞ | (9) | | |

ASS①

| | |
|---|---|
| R | −201.20 |
| K | 4.6102 |
| A | $2.1348 \times 10^{-7}$ |
| B | $-2.8210 \times 10^{-11}$ |
| C | $3.7292 \times 10^{-15}$ |

FFS①

$C_4$ $1.5891 \times 10^{-3}$   $C_6$ $-1.0000 \times 10^{-3}$   $C_8$ $-4.8755 \times 10^{-5}$
$C_{10}$ $-4.6567 \times 10^{-5}$   $C_{11}$ $-3.6467 \times 10^{-7}$   $C_{13}$ $-4.1721 \times 10^{-7}$

FFS②

$C_4$ $-1.0260 \times 10^{-2}$   $C_6$ $-3.5937 \times 10^{-2}$   $C_8$ $-9.0101 \times 10^{-3}$
$C_{10}$ $-5.3472 \times 10^{-3}$

FFS③

$C_4$ $1.1368 \times 10^{-2}$   $C_6$ $7.5881 \times 10^{-3}$   $C_8$ $-3.1294 \times 10^{-3}$
$C_{10}$ $-2.5324 \times 10^{-3}$   $C_{11}$ $1.1681 \times 10^{-4}$   $C_{13}$ $-6.3376 \times 10^{-6}$
$C_{15}$ $-1.2382 \times 10^{-4}$

FFS④

$C_4$ $-1.8960 \times 10^{-2}$   $C_6$ $-8.3411 \times 10^{-3}$   $C_8$ $-4.0233 \times 10^{-3}$
$C_{10}$ $-4.1624 \times 10^{-3}$   $C_{11}$ $2.4768 \times 10^{-4}$   $C_{13}$ $8.5844 \times 10^{-4}$
$C_{15}$ $4.4602 \times 10^{-4}$

FFS⑤

$C_4$ $5.2263 \times 10^{-2}$   $C_6$ $6.0334 \times 10^{-2}$   $C_8$ $9.6523 \times 10^{-3}$
$C_{10}$ $6.3677 \times 10^{-3}$ -continued

Displacement and tilt(1)

| X 0.00 | Y 0.00 | Z 400.00 |
|---|---|---|
| α 0.00 | β 0.00 | γ 0.00 |

Displacement and tilt(2)

| X 0.00 | Y −47.41 | Z 402.00 |
|---|---|---|
| α 0.00 | β 0.00 | γ 0.00 |

Displacement and tilt(3)

| X 0.00 | Y −42.28 | Z 349.62 |
|---|---|---|
| α 12.54 | β 0.00 | γ 0.00 |

Displacement and tilt(4)

| X 0.00 | Y −46.05 | Z 343.02 |
|---|---|---|
| α 49.62 | β 0.00 | γ 0.00 |

Displacement and tilt(5)

| X 0.00 | Y −40.81 | Z 344.98 |
|---|---|---|
| α 95.96 | β 0.00 | γ 0.00 |

Displacement and tilt(6)

| X 0.00 | Y −46.59 | Z 348.65 |
|---|---|---|
| α 130.36 | β 0.00 | γ 0.00 |

Displacement and tilt(7)

| X 0.00 | Y −47.35 | Z 349.06 |
|---|---|---|
| α 129.74 | β 0.00 | γ 0.00 |

Displacement and tilt(8)

| X 0.00 | Y −44.96 | Z −59.23 |
|---|---|---|
| α 66.19 | β 0.00 | γ 0.00 |

Displacement and tilt(9)

| X 0.00 | Y −45.87 | Z −59.64 |
|---|---|---|
| α 78.25 | β 0.00 | γ 0.00 |

EXAMPLE 2

| Surface No. | Radius of curvature | Surface separation and tilt | Refractive index | Abbe's No. |
|---|---|---|---|---|
| Object plane | ∞ | (1) | | |
| 1 | ∞ (Pupil) | | | |
| 2 | FFS① | (1) | 1.5254 | 56.2 |
| 3 | ASS① (FR, RE) | (2) | 1.5254 | 56.2 |
| 4 | FFS① | (1) | | |
| 5 | FFS② | (3) | 1.5254 | 56.2 |
| 6 | FFS③ (RE) | (4) | 1.5254 | 56.2 |
| 7 | FFS④ (RE) | (5) | 1.5254 | 56.2 |
| 8 | FFS⑤ | (6) | | |
| Image plane | ∞ | (7) | | |
| 10 | FFS⑤ | (6) | 1.5254 | 56.2 |
| 11 | FFS④ (RE) | (5) | 1.5254 | 56.2 |
| 12 | FFS③ | (4) | 1.5254 | 56.2 |
| 13 | 10.37 (FR) | (8) | | |
| Light source | ∞ | (9) | | |

ASS①

| R | −133.19 |
|---|---|
| K | $6.4555 \times 10^{-1}$ |
| A | $3.3841 \times 10^{-7}$ |
| B | $-2.6319 \times 10^{-11}$ |
| C | $2.5165 \times 10^{-15}$ |

FFS①

| $C_4$ $-1.9194 \times 10^{-4}$ | $C_6$ $-1.0000 \times 10^{-3}$ | $C_8$ $-3.2513 \times 10^{-6}$ |
|---|---|---|
| $C_{10}$ $7.2414 \times 10^{-6}$ | $C_{11}$ $7.4382 \times 10^{-8}$ | $C_{13}$ $1.8783 \times 10^{-7}$ |

FFS②

| $C_4$ $2.1106 \times 10^{-2}$ | $C_6$ $-5.3200 \times 10^{-2}$ | $C_7$ $3.7839 \times 10^{-4}$ |
|---|---|---|
| $C_8$ $-6.9686 \times 10^{-3}$ | $C_9$ $-1.1751 \times 10^{-5}$ | $C_{10}$ $-2.7197 \times 10^{-3}$ |

FFS③

| $C_4$ $7.9132 \times 10^{-3}$ | $C_6$ $-2.0184 \times 10^{-2}$ | $C_7$ $-1.6399 \times 10^{-4}$ |
|---|---|---|
| $C_8$ $-2.3055 \times 10^{-3}$ | $C_9$ $-7.4669 \times 10^{-4}$ | $C_{10}$ $-1.9296 \times 10^{-3}$ |
| $C_{11}$ $2.8401 \times 10^{-4}$ | $C_{13}$ $3.0639 \times 10^{-4}$ | $C_{15}$ $5.0616 \times 10^{-5}$ |

FFS④

| $C_4$ $-2.2791 \times 10^{-2}$ | $C_6$ $-3.1161 \times 10^{-2}$ | $C_7$ $-5.8291 \times 10^{-5}$ |
|---|---|---|
| $C_8$ $-1.3962 \times 10^{-3}$ | $C_9$ $-1.5979 \times 10^{-4}$ | $C_{10}$ $-7.7693 \times 10^{-4}$ |
| $C_{11}$ $1.0836 \times 10^{-4}$ | $C_{13}$ $1.2384 \times 10^{-4}$ | $C_{15}$ $3.7512 \times 10^{-6}$ |

FFS⑤

| $C_4$ $2.6541 \times 10^{-2}$ | $C_6$ $-2.9069 \times 10^{-2}$ | $C_7$ $-7.5865 \times 10^{-4}$ |
|---|---|---|
| $C_8$ $-1.8137 \times 10^{-3}$ | $C_9$ $-1.5343 \times 10^{-3}$ | $C_{10}$ $9.1238 \times 10^{-4}$ |

Displacement and tilt(1)

| X 0.00 | Y 0.00 | Z 400.00 |
|---|---|---|
| α 0.00 | β 0.00 | γ 0.00 |

Displacement and tilt(2)

| X 0.00 | Y −32.78 | Z 402.00 |
|---|---|---|
| α 0.00 | β 0.00 | γ 0.00 |

Displacement and tilt(3)

| X 0.00 | Y −36.05 | Z 357.04 |
|---|---|---|
| α 18.27 | β 0.30 | γ 0.00 |

Displacement and tilt(4)

| X 0.02 | Y −40.99 | Z 349.09 |
|---|---|---|
| α 55.65 | β 3.11 | γ 0.00 |

Displacement and tilt(5)

| X −0.75 | Y −33.22 | Z 350.52 |
|---|---|---|
| α 95.68 | β 2.50 | γ 0.00 |

Displacement and tilt(6)

| X −0.87 | Y −41.54 | Z 353.83 |
|---|---|---|
| α 119.99 | β 11.82 | γ 0.00 |

Displacement and tilt(7)

| X −1.02 | Y −42.56 | Z 354.15 |
|---|---|---|
| α 119.83 | β 5.32 | γ −4.11 |

Displacement and tilt(8)

| X −3.46 | Y −40.60 | Z −52.73 |
|---|---|---|
| α 88.97 | β −14.43 | γ 0.00 |

Displacement and tilt(9)

| X −3.13 | Y −41.74 | Z −52.75 |
|---|---|---|
| α 105.80 | β 9.44 | γ 0.00 |

EXAMPLE 3

| Surface No. | Radius of curvature | Surface separation and tilt | Refractive index | Abbe's No. |
|---|---|---|---|---|
| Object plane | ∞ | (1) | | |
| 1 | ∞ (Pupil) | | | |
| 2 | FFS① | (1) | 1.5254 | 56.2 |
| 3 | ASS① (FR, RE) | (2) | 1.5254 | 56.2 |
| 4 | FFS① | (1) | | |
| 5 | FFS② | (3) | 1.5254 | 56.2 |
| 6 | FFS③ (RE) | (4) | 1.5254 | 56.2 |
| 7 | FFS④ (RE) | (5) | 1.5254 | 56.2 |
| 8 | FFS⑤ | (6) | | |

-continued

| | | | | |
|---|---|---|---|---|
| Image plane | ∞ | (7) | | |
| 10 | FFS⑤ | (6) | 1.5254 | 56.2 |
| 11 | FFS④ | (5) | 1.5254 | 56.2 |
| 12 | −4.17 (FR) | (8) | | |
| Light source | ∞ | (9) | | |

ASS①

| | |
|---|---|
| R | −148.96 |
| K | 2.1285 |
| A | $2.8611 \times 10^{-7}$ |
| B | $-1.5596 \times 10^{-11}$ |
| C | $2.9945 \times 10^{-15}$ |

FFS①

$C_4\ 5.7142 \times 10^{-4}$  $C_6\ -1.0000 \times 10^{-3}$  $C_8\ -1.9170 \times 10^{-5}$
$C_{10}\ -7.0062 \times 10^{-6}$  $C_{11}\ -2.0543 \times 10^{-7}$  $C_{13}\ -1.0578 \times 10^{-7}$

FFS②

$C_4\ 4.4129 \times 10^{-2}$  $C_6\ -2.3084 \times 10^{-2}$  $C_8\ -2.0324 \times 10^{-2}$
$C_{10}\ -5.9502 \times 10^{-3}$

FFS③

$C_4\ 1.3264 \times 10^{-2}$  $C_6\ 3.6547 \times 10^{-3}$  $C_8\ -2.5516 \times 10^{-3}$
$C_{10}\ -2.7908 \times 10^{-3}$  $C_{11}\ -1.6791 \times 10^{-5}$  $C_{13}\ -2.4067 \times 10^{-5}$
$C_{15}\ -1.3790 \times 10^{-4}$

FFS④

$C_4\ -1.8378 \times 10^{-2}$  $C_6\ -1.0019 \times 10^{-2}$  $C_8\ -1.8146 \times 10^{-3}$
$C_{10}\ -1.6015 \times 10^{-3}$  $C_{11}\ 3.0458 \times 10^{-5}$  $C_{13}\ 1.1324 \times 10^{-4}$
$C_{15}\ 1.2047 \times 10^{-4}$

FFS⑤

$C_4\ 1.3484 \times 10^{-2}$  $C_6\ 7.7581 \times 10^{-2}$  $C_8\ 1.6390 \times 10^{-3}$
$C_{10}\ -1.1533 \times 10^{-3}$

| Displacement and tilt(1) | | |
|---|---|---|
| X 0.00 | Y 0.00 | Z 400.00 |
| α 0.00 | β 0.00 | γ 0.00 |
| Displacement and tilt(2) | | |
| X 0.00 | Y −35.90 | Z 402.00 |
| α 0.00 | β 0.00 | γ 0.00 |
| Displacement and tilt(3) | | |
| X 0.00 | Y −39.15 | Z 353.34 |
| α 36.66 | β 0.00 | γ 0.00 |
| Displacement and tilt(4) | | |
| X 0.00 | Y −44.60 | Z 346.47 |
| α 55.53 | β 0.00 | γ 0.00 |
| Displacement and tilt(5) | | |
| X 0.00 | Y −39.16 | Z 348.17 |
| α 105.86 | β 0.00 | γ 0.00 |
| Displacement and tilt(6) | | |
| X 0.00 | Y −44.08 | Z 353.84 |
| α 128.13 | β 0.00 | γ 0.00 |
| Displacement and tilt(7) | | |
| X 0.00 | Y −45.68 | Z 356.13 |
| α 139.99 | β 0.00 | γ 0.00 |
| Displacement and tilt(8) | | |
| X 0.00 | Y −37.92 | Z −51.08 |
| α 132.81 | β 0.00 | γ 0.00 |
| Displacement and tilt(9) | | |
| X 0.00 | Y −35.93 | Z −53.30 |
| α 126.76 | β 0.00 | γ 0.00 |

EXAMPLE 4

| Surface No. | Radius of curvature | Surface separation and tilt Displacement | Refractive index | Abbe's No. |
|---|---|---|---|---|
| Object plane | ∞ | (1) | | |
| 1 | ∞ (Pupil) | (1) | | |
| 2 | FFS① | (1) | 1.5254 | 56.2 |
| 3 | ASS① (FR, RE) | (2) | 1.5254 | 56.2 |
| 4 | FFS① | (1) | | |
| 5 | FFS② | (3) | 1.5254 | 56.2 |
| 6 | FFS③ (RE) | (4) | 1.5254 | 56.2 |
| 7 | FFS④ (RE) | (5) | 1.5254 | 56.2 |
| 8 | FFS⑤ | (6) | | |
| Image plane | ∞ | (7) | | |
| 10 | FFS⑤ | (6) | 1.5254 | 56.2 |
| 11 | FFS④ (RE) | (5) | 1.5254 | 56.2 |
| 12 | FFS③ (RE) | (4) | 1.5254 | 56.2 |
| 13 | FFS② | (3) | 1.5254 | 56.2 |
| 14 | −6.69 (FR) | (8) | | |
| Light source | ∞ | (9) | | |

ASS①

| | |
|---|---|
| R | −199.86 |
| K | 2.6674 |
| A | $7.9237 \times 10^{-8}$ |
| B | $-9.9684 \times 10^{-12}$ |
| C | $9.0846 \times 10^{-16}$ |

FFS①

$C_4\ 1.7595 \times 10^{-3}$  $C_6\ -1.0000 \times 10^{-3}$  $C_8\ -6.2278 \times 10^{-5}$
$C_{10}\ -5.9358 \times 10^{-5}$  $C_{11}\ -5.6394 \times 10^{-7}$  $C_{13}\ -7.2785 \times 10^{-8}$

FFS②

$C_4\ 7.7494 \times 10^{-2}$  $C_6\ 9.7789 \times 10^{-2}$  $C_8\ -3.4926 \times 10^{-3}$

FFS③

$C_4\ 1.3745 \times 10^{-2}$  $C_6\ 2.5221 \times 10^{-2}$  $C_8\ -8.6548 \times 10^{-4}$
$C_{10}\ -1.2213 \times 10^{-4}$  $C_{11}\ 1.1546 \times 10^{-5}$

FFS④

$C_4\ -2.1064 \times 10^{-2}$  $C_6\ 2.0295 \times 10^{-3}$  $C_8\ -5.2989 \times 10^{-4}$
$C_{10}\ -4.5217 \times 10^{-4}$  $C_{11}\ 1.3828 \times 10^{-6}$

FFS⑤

$C_4\ -8.4997 \times 10^{-2}$  $C_6\ -5.6269 \times 10^{-2}$  $C_8\ 2.2737 \times 10^{-2}$

| Displacement and tilt(1) | | |
|---|---|---|
| X 0.00 | Y 0.00 | Z 400.00 |
| α 0.00 | β 0.00 | γ 0.00 |
| Displacement and tilt(2) | | |
| X 0.00 | Y −42.90 | Z 402.00 |
| α 0.00 | β 0.00 | γ 0.00 |
| Displacement and tilt(3) | | |
| X 0.00 | Y −39.07 | Z 353.43 |
| α 21.32 | β −4.91 | γ 0.00 |
| Displacement and tilt(4) | | |
| X −0.24 | Y −43.39 | Z 346.79 |
| α 58.48 | β 1.17 | γ 0.00 |
| Displacement and tilt(5) | | |
| X −0.63 | Y −37.65 | Z 347.39 |
| α 108.20 | β −8.02 | γ 0.00 |
| Displacement and tilt(6) | | |
| X −3.54 | Y −43.95 | Z 353.43 |
| α 142.72 | β −5.56 | γ 0.00 |

-continued

| Displacement and tilt(7) | | |
|---|---|---|
| X −4.17 | Y −44.99 | Z 354.25 |
| α 130.03 | β −10.18 | γ 4.01 |
| Displacement and tilt(8) | | |
| X −2.85 | Y −37.27 | Z −44.92 |
| α 31.59 | β −6.87 | γ 0.00 |
| Displacement and tilt(9) | | |
| X −2.63 | Y −36.76 | Z −44.09 |
| α 36.23 | β −4.55 | γ 0.00 |

FIGS. 13, 14, 15 and 16 are transverse aberration diagrams for Examples, 1, 2, 3 and 4, wherein the bracketed figures stand for the horizontal and vertical angles of view, respectively, and transverse aberrations at those angles are shown.

Figure 17:
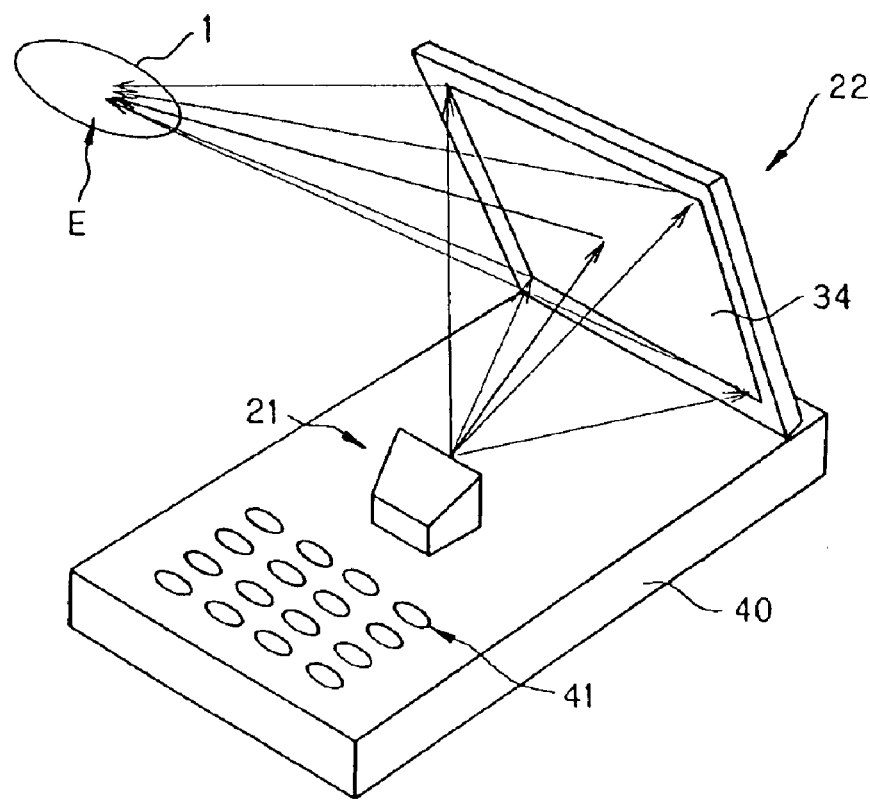
FIG. 17 is one perspective schematic of the display optical system of the invention as applied to a personal digital assistant.
Figure 18:
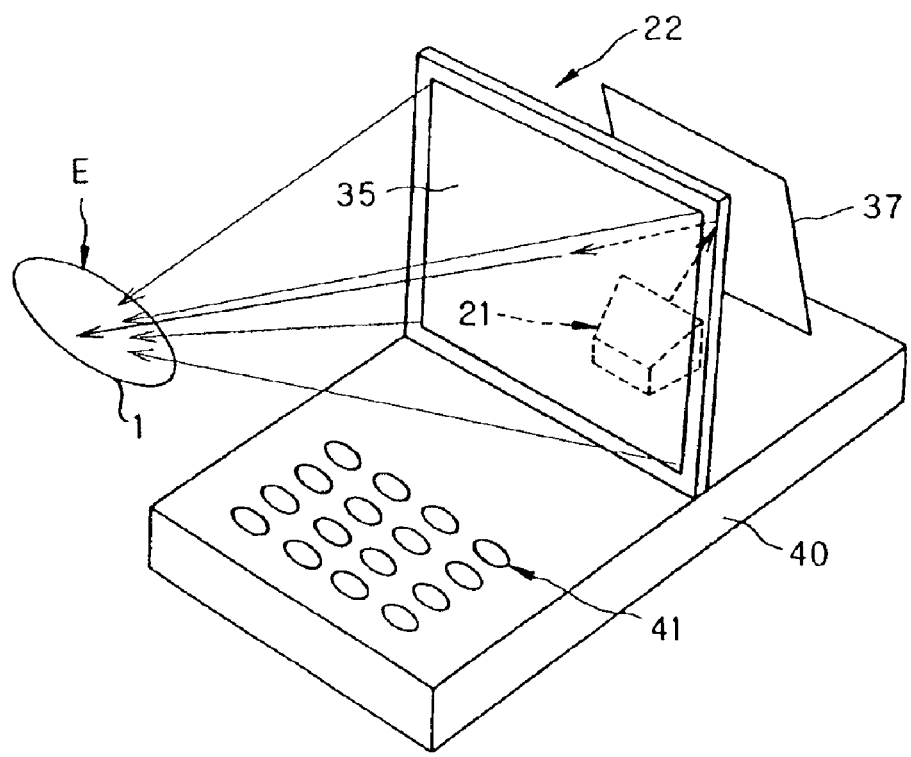
FIG. 18 is another perspective schematic of the display optical system of the invention as applied to a personal digital assistant.
Figure 19:
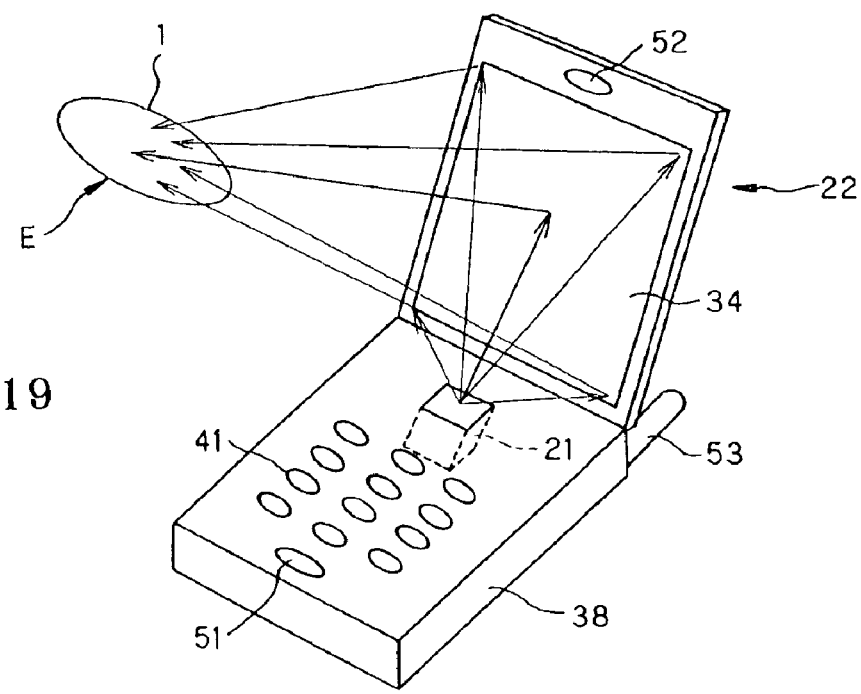
FIG. 19 is one perspective schematic of the display optical system of the invention as applied to a cellular phone.
Figure 20:
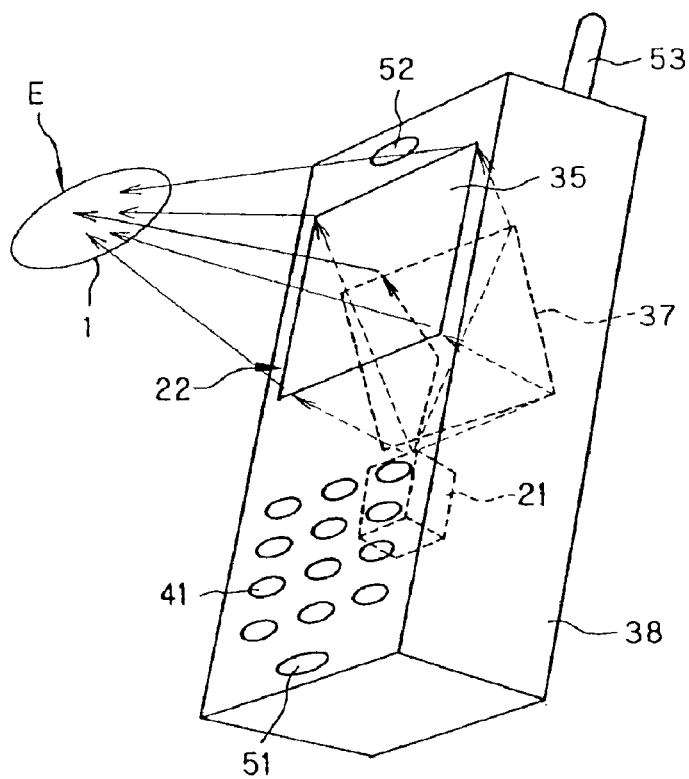
FIG. 20 is another perspective schematic of the display optical system of the invention as applied to a cellular phone.

The display system using each of the display optical systems exemplified in Examples 1, 2, 3 and 4, for instance, may be applied to such personal digital assistants as shown in FIGS. 17 and 18 or, alternatively, to such cellular phones as shown in FIGS. 19 and 20. In either case, it is possible to provide a system that is low cost, low power consumption, and very excellent in portability.

FIG. 17 is illustrative of an eyepiece optical system 22 built up of an optical element 34 having a reflecting action. For the optical element 34, a Fresnel reflecting mirror 30 is used. On a system body 40, there are manipulating buttons 41. It is then desired that the manipulating buttons 41 be located in front of a relay optical system 21, as viewed from a viewer side. Thus, there is no possibility that an optical path is cut off by hands upon manipulation of the buttons 41, and so it is possible to avert the problem that images are blocked for each manipulation of buttons.

The relay optical system 21 is located in front of the eyepiece optical system 22, so that images reflected at the eyepiece optical system 22 can reasonably be viewed.

In FIG. 17, the position of the eyeball of a viewer is indicated at E. By bringing one eye or both eyes of the viewer in line with the position of the exit pupil 1 of the display system, it is possible to view displayed images reasonably. Although not illustrated, a reflection type display device 3 (see FIGS. 1 to 12) is located on the body 40 side of the relay optical system 21.

Referring to FIG. 18, an eyepiece optical system 22 has a mechanism capable of folding or unfolding it with respect to a system body 40, so that the system can be received in a pocket or the like during carrying. Provision of an additional de-energizing function contributes largely to power saving.

It is preferable that the eyepiece optical system 22 is unfolded at its view side end from the system body 40, because the optical surface of the eyepiece optical system 20 is not exposed to view during folding and so dust or the like is less likely to be deposited on the optical surface.

Referring again to FIG. 18, the eyepiece optical system 22 is built up of an optical element 35 having at least a transmitting action. For the optical element 35, a Fresnel reflecting mirror is used. In this case, too, manipulating buttons 41 should preferably be located in front of the eyepiece optical system 22, as viewed from a viewer side. Thus, there is no possibility that an optical path is cut off by hands upon manipulation of the buttons 41, and so it is possible to avert the problem that images are blocked for each manipulation of buttons.

The eyepiece optical system 22 is located in front of the relay optical system 21, so that images can reasonably be viewed.

In the embodiment of FIG. 18, the eyepiece optical system 22 should preferably be folded down on the side of the relay optical system 21, so that the surface of the eyepiece optical system 22 can take a cover role in protection of the relay optical system 21.

When the embodiment of either FIG. 17 or FIG. 18 is used, it is acceptable to interpose a reflecting mirror 37 (see FIG. 18) between the relay optical system 21 and the eyepiece optical system 22. This is preferable because an optical path can be bent with the result that the distance from the relay optical system 21 to the eyepiece optical system 22 can be made short.

More preferably, the reflecting mirror 37 should have power enough to disperse the power of the eyepiece optical system 22. It is thus possible to display larger, clearer images. Preferably in this case, the reflecting mirror 37 should be received beneath the eyepiece optical system 22, thereby preventing exposure of its optical surface and so improving its dustproofness.

FIGS. 19 and 20 are illustrative of a cellular phone 38 incorporating the display system of the invention. The display system comprises an eyepiece optical system 22 and a relay optical system 21. With the system of FIGS. 19 and 20, displayed images can reasonably be viewed at the position of an exit pupil 1.

The cellular phone 38 is provided with a microphone 51, a speaker 52, an antenna 53, manipulating buttons 41 and the display system of the invention. Via the microphone 51, voice information of an operator is entered into the cellular phone. Via the speaker 52, voices of a person at the other end are produced. Via the antenna 53, communication waves are transmitted and received. Via the manipulating buttons 41, the operator enters information in the cellular phone. The display system provides projection and display of images taken of the operator, a person at the other end and various pieces of information such as telephone numbers.

The embodiment of FIG. 19 comprises a mechanism for folding or unfolding an eyepiece optical system 22 with respect to the body of the cellular phone 38. During carrying, the cellular phone 38 with the eyepiece optical system 22 folded down can be received in a pocket or the like. In the embodiment of FIG. 20, an eyepiece optical system 22 is fixed onto the surface of the body of a cellular phone 38, and a relay optical system 21 and a reflecting mirror 37 are fixedly housed in the body. This system can be received in a pocket or the like while the eyepiece optical system 22 remains unfolded.

What we claim is:

1. A display optical system, comprising:

a reflection type display device for displaying an image, an illumination light source for illuminating said reflection type display device, an illumination optical system for guiding light from said illumination light source to said reflection type display device, a relay optical system for projection of an image appearing on said reflection type display device said relay optical system being a decentered prism optical system comprising at least one reflecting surface, wherein said at least one reflecting surface is curved in such a way as to give power to a light beam and provide a rotationally asymmetric surface; and an eyepiece optical system for converging a light beam from said relay optical system at a predetermined position, wherein:

said eyepiece optical system is located at or near a position of an image projected through said relay optical system; and said illumination optical system and said decentered prism optical system have at least one common optical surface.

2. The display optical system according to claim 1, wherein the following condition (1) is satisfied:

$$0° \leq \theta < 45° \tag{1}$$

where θ is an angle that a given reference axis makes with an axial chief ray leaving said reflection type display device, wherein:

said given reference axis is a normal that passes through a center of said reflection type display device.

3. The display optical system according to claim 1, said decentered prism optical system has a symmetric plane.

4. The display optical system according to claim 1, said decentered prism optical system has no symmetric plane.

5. The display optical system according to claim 1, said illumination light source is located such that an optical axis of illumination light incident on said given reflecting surface is not included in a plane that passes through an axial chief ray of projection light reflected at said given reflecting surface and a center of a screen surface, where:

the optical axis of illumination light is a center light ray of an illumination light beam, and the center light ray of the illumination light beam is a light ray of the illumination light from the illumination light source, which light ray arrives at the center of the screen surface of the reflection type display device, and said given reflecting surface is a first reflecting surface as counted from the reflection type display device of the display optical system in order of propagation of projection light.

6. The display optical system according to claim 1, said decentered prism optical system comprises:

an entrance surface through which a light ray enters said decentered prism optical system, a first reflecting surface, a second reflecting surface, and an exit surface through which the light ray leaves said decentered prism optical system, wherein:

a plane including one optical path crosses another optical path within a prism.

7. The display optical system according to claim 1 said eyepiece optical system is constructed of an optical element having a Fresnel surface.

8. The display optical system according to claim 1, said decentered prism optical system is constructed such that on said common optical surface, a transmitting area for transmitting light from said light source and a reflecting area for reflecting light from said reflection type optical device are separately formed.

9. A personal digital assistant comprising:

a display optical system as recited in claim 1, and an input operation portion.

10. A cellular phone comprising:

a display optical system as recited in claim 1, an input operation portion, a microphone portion, a speaker portion, and an antenna.

* * * * *